(12) United States Patent
Okamura et al.

(10) Patent No.: US 9,243,155 B2
(45) Date of Patent: Jan. 26, 2016

(54) INK JET INK, INK CARTRIDGE, AND INK JET RECORDING METHOD

(75) Inventors: Daiji Okamura, Tokyo (JP); Kousuke Yamasaki, Kawasaki (JP); Kenji Moribe, Fujisawa (JP); Kouichirou Okumura, Kawasaki (JP); Kenichi Shiiba, Warabi (JP); Hiromitsu Kishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 173 days.

(21) Appl. No.: 14/008,523

(22) PCT Filed: Mar. 19, 2012

(86) PCT No.: PCT/JP2012/001891
§ 371 (c)(1),
(2), (4) Date: Sep. 27, 2013

(87) PCT Pub. No.: WO2012/132305
PCT Pub. Date: Oct. 4, 2012

(65) Prior Publication Data
US 2014/0015895 A1    Jan. 16, 2014

(30) Foreign Application Priority Data

Mar. 30, 2011 (JP) ................. 2011-075884
Mar. 30, 2011 (JP) ................. 2011-075885

(51) Int. Cl.
| | | |
|---|---|---|
| B41J 2/01 | (2006.01) | |
| C09D 11/30 | (2014.01) | |
| C09D 175/04 | (2006.01) | |
| C09D 11/102 | (2014.01) | |
| C09D 11/322 | (2014.01) | |
| C09D 11/54 | (2014.01) | |
| B41J 2/175 | (2006.01) | |

(52) U.S. Cl.
CPC . *C09D 11/30* (2013.01); *B41J 2/01* (2013.01); *B41J 2/17503* (2013.01); *C09D 11/102* (2013.01); *C09D 11/322* (2013.01); *C09D 11/54* (2013.01); *C09D 175/04* (2013.01)

(58) Field of Classification Search
CPC ........ B41J 2/05; B41J 2/17503; B41J 2/2107; B41J 2/2114; C09D 11/322; C09D 11/324; C09D 11/38; C09D 11/30; C09D 11/36; C09D 11/54; C09D 11/102; C09D 11/10; C09D 175/042
USPC ............. 347/56, 86, 95–100; 106/31.13, 31.6
See application file for complete search history.

(56) References Cited

U.S. PATENT DOCUMENTS

| | | | |
|---|---|---|---|
| 8,684,509 B2 * | 4/2014 | Yamasaki et al. | 347/100 |
| 8,690,307 B2 * | 4/2014 | Okumura et al. | 347/100 |
| 8,757,788 B2 * | 6/2014 | Okamura et al. | 347/100 |
| 2003/0166742 A1 * | 9/2003 | Hirasa et al. | 523/160 |
| 2011/0143040 A1 * | 6/2011 | Yamasaki et al. | 427/427.4 |

FOREIGN PATENT DOCUMENTS

| | | |
|---|---|---|
| CN | 001526776 A | 9/2004 |
| CN | 001718606 A | 1/2006 |
| JP | 9291242 A | 11/1997 |
| JP | 2003342502 A | 12/2003 |
| JP | 2004285344 A | 10/2004 |
| JP | 2005515289 A | 5/2005 |
| JP | 2008179657 A | 8/2008 |
| JP | 2008280363 A | 11/2008 |
| JP | 2010195965 A | 9/2010 |
| JP | 2010229310 A | 10/2010 |
| WO | 2009/115831 A1 | 9/2009 |
| WO | 2010/147589 A1 | 12/2010 |
| WO | 2010143518 A1 | 12/2010 |
| WO | 2011/074167 A1 | 6/2011 |
| WO | 2011148709 A1 | 12/2011 |

* cited by examiner

*Primary Examiner* — Matthew Luu
*Assistant Examiner* — Rut Patel
(74) *Attorney, Agent, or Firm* — Canon U.S.A. Inc., IP Division

(57) ABSTRACT

An ink jet ink contains a polyurethane polymer and a self-dispersing pigment. The polyurethane polymer has units derived from a polyisocyanate, a polyol having no acid group, and a diol having an acid group. The molar ratio of the percentage of the urethane bond in the polyurethane polymer to the percentage of the urea bond in the polyurethane polymer is 85.0/15.0 or more and 100.0/0 or less. The ink jet ink may be capable of producing an image having high optical density, scratch resistance, and highlighter resistance, and which has excellent ink ejection stability and can reduce image deflection caused by face wetting.

12 Claims, No Drawings

INK JET INK, INK CARTRIDGE, AND INK JET RECORDING METHOD

TECHNICAL FIELD

The present invention relates to an ink jet ink, an ink cartridge containing the ink jet ink, and an ink jet recording method.

BACKGROUND ART

In recent years, various important characteristics have been required for ink jet inks, for example, ink reliability (including ejection stability and ejection accuracy), image quality (including high optical density), and image fastness (including scratch resistance and highlighter resistance). In order to improve these characteristics, various pigment inks containing a polyurethane polymer have been studied (PTLs 1 to 4). PTL 1 discloses an aqueous ink jet ink that contains a dispersion of a polyurethane polymer having an acid group and a self-dispersing pigment. PTL 2 discloses a pigment dispersion that contains a polyurethane polymer, which contains a compound having three or more hydroxy groups and a soft segment having a carboxy group. The soft segment contains a polyol. PTL 3 discloses an aqueous pigment ink containing a polyurethane polymer in which the ratio of the urethane bond to the urea bond is specified. PTL 4 discloses an aqueous pigment ink that contains a polyurethane polymer having no urea bond.

CITATION LIST

Patent Literature

PTL 1: PCT Japanese Translation Patent Publication No. 2005-515289
PTL 2: Japanese Patent Laid-Open No. 2008-179657
PTL 3: Japanese Patent Laid-Open No. 9-291242
PTL 4: Japanese Patent Laid-Open No. 2004-285344

SUMMARY OF INVENTION

Technical Problem

The present inventors found that conventional pigment inks containing a polyurethane polymer have improved ink reliability, image quality, and image fastness but still do not sufficiently satisfy the requirements.

The present inventors found that use of the polyurethane polymer described in PTL 1 results in an acid value as low as approximately 20 to 30 mgKOH/g and consequently poor ink ejection stability. It was also found that a polyurethane polymer that contains 10% by mole or more of a compound having three or more hydroxy groups based on all the compounds having a hydroxy group as disclosed in PTL 2 becomes excessively rigid, resulting in poor image fastness. It was also found that the polyurethane polymer disclosed in PTL 2 has an acid value as low as 30 mgKOH/g, resulting in poor ink ejection stability.

In the polyurethane polymer disclosed in PTL 3, the molar ratio of the urethane bond to the urea bond is in the range of 80/20 to 50/50. The present inventors found that the ejection of such an ink containing a polyurethane polymer as disclosed in PTL 3 through an ink jet recording head results in the deposition of a polymer component of the ink on a surface of the recording head on which the ejection ports are disposed (hereinafter referred to as a "face"). This phenomenon is referred to as "face wetting". The polymer component deposited on the face may change the intended flight direction of an ejected ink droplet. This deflection may be small immediately after the ejection of the ink droplet but increase before reaching a recording medium, causing a problem of the deflection of some dots in the image (hereinafter referred to as "image deflection"). This image deflection occurs not only in a thermal ink jet method but also in an ink jet method involving the use of a piezoelectric element.

The polyurethane polymer disclosed in PTL 4 has no urea bond. Thus, the aqueous pigment ink disclosed in PTL 4 rarely causes image deflection. However, because of the use of a polymer-dispersed pigment, a desired optical density cannot be achieved.

Accordingly, the present invention provides an ink jet ink that produces an image having high optical density, scratch resistance, and highlighter resistance, has excellent ink ejection stability, and can reduce image deflection caused by face wetting. The present invention also provides an ink cartridge containing an ink according to an embodiment of the present invention and an ink jet recording method.

Solution to Problem

These objects can be achieved by the present invention described below. An ink jet ink according to one aspect of the present invention contains a polyurethane polymer and a self-dispersing pigment. The polyurethane polymer has units derived from a polyisocyanate, a polyol having no acid group, and a diol having an acid group. The polyol having no acid group contains a polyether polyol having no acid group, and the percentage (% by mole) constituted by a unit derived from the polyether polyol having no acid group with respect to all the units derived from the polyol having no acid group is 80% by mole or more. The polyether polyol has a number-average molecular weight of 450 or more and 4,000 or less. The ratio of the percentage (% by mole) of urethane bonds in the polyurethane polymer to the percentage (% by mole) of urea bonds in the polyurethane polymer is 85.0/15.0 or more and 100.0/0 or less. The diol having an acid group is at least one selected from dimethylolpropionic acid and dimethylolbutanoic acid, and the acid value of the polyurethane polymer resulting from the unit(s) derived from the diol having an acid group is 40 mgKOH/g or more and 140 mgKOH/g or less.

Advantageous Effects of Invention

The present invention can provide an ink jet ink that produces an image having high optical density, scratch resistance, and highlighter resistance, has excellent ink ejection stability, and can reduce image deflection caused by face wetting. The present invention can also provide an ink cartridge containing an ink according to an embodiment of the present invention and an ink jet recording method.

DESCRIPTION OF EMBODIMENTS

The present invention will be described in detail with reference to the following embodiments. An ink jet ink (hereinafter referred to simply as an "ink") according to an embodiment of the present invention contains a polyurethane polymer and a self-dispersing pigment. The polyurethane polymer has units derived from a polyisocyanate, a polyol having no acid group, and at least one selected from dimethylolpropionic acid and dimethylolbutanoic acid. The polyol having no acid group contains a polyether polyol having no acid group, and the percentage (% by mole) constituted by a unit derived from the polyether polyol having no acid group with respect to all the units derived from the polyol having no acid group is 80% by mole or more. The polyether polyol has a number-average molecular weight of 450 or more and 4,000 or less. The ratio of the percentage (% by mole) of urethane bonds in the polyurethane polymer to the percentage (% by mole) of urea bonds in the polyurethane polymer is 85.0/15.0 or more and 100/0 or less. The acid value of the polyurethane polymer resulting from the unit(s) derived from the at least one selected from dimethylolpropionic acid and dimethylolbutanoic acid is 40 mgKOH/g or more and 140 mgKOH/g or less.

The present inventors studied various pigment inks containing a polyurethane polymer. In accordance with routine procedures, in order to improve ink ejection stability, polyurethane polymers having a high acid value or high hydrophilicity were studied. As a result, it was found that some polyurethane polymers provided markedly poor image fastness (scratch resistance and highlighter resistance). As a result of extensive studies, the present inventors found that the compounds constituting the polyurethane polymer are greatly responsible for the poor image fastness. The details are described below.

The polyurethane polymer is mainly composed of two segments: a hard segment and a soft segment. The hard segment is mainly composed of a polyisocyanate, a short-chain diol, and a chain extension agent. The soft segment is mainly composed of a polyol. The hard segment substantially contributes to high strength, while the soft segment substantially contributes to flexibility. A micro phase separation structure of the two segments can impart high strength and flexibility, that is, high elasticity to a film of the polyurethane polymer. Such film characteristics are closely related to image fastness.

As described above, a hydrophilic polyurethane polymer is generally obtained by increasing the acid value of the polyurethane polymer. The acid value of the polyurethane polymer depends substantially on the number of units derived from a compound having an acid group in the polyurethane polymer. Thus, in order to increase the acid value of the polyurethane polymer, the amount of compound having an acid group used in the synthesis of the polyurethane polymer must be increased. In general, the compound having an acid group for use in the synthesis of the polyurethane polymer may be (a) a polyol having an acid group or (b) a diol having an acid group.

The (a) polyol having an acid group may be an acid-modified polyol, such as a carboxylic-acid-modified polycaprolactone diol. However, it was found that the synthesis of the polyurethane polymer only using a polyol having an acid group as a compound having an acid group results in marked decreases in the scratch resistance and highlighter resistance of an image. This phenomenon occurred not only in the case of high acid values but also in the case of low acid values, that is, in the case that the amount of polyol having an acid group was small. This is probably because the polyurethane polymer synthesized using a polyol having an acid group has the acid group in the soft segment and consequently has a poor balance between strength and flexibility. Thus, it was found that even when a polyurethane polymer synthesized only using a polyol having an acid group as a compound having an acid group is used in an ink, high ink ejection stability and image fastness cannot be achieved.

The (b) diol having an acid group may be dimethylolpropionic acid (hereinafter referred to as DMPA) or dimethylolbutanoic acid (hereinafter referred to as DMBA). An increase in the amount of DMPA or DMBA to increase the acid value of the polyurethane polymer results in an increase in the number of hydroxy groups. Thus, an increase in the amount of DMPA or DMBA used must be compensated for by a relative decrease in the amount of polyol component, which has a hydroxy group reactive with an isocyanate like DMPA or DMBA. This decreases the number of soft segments, reduces the flexibility of the polyurethane polymer, and increases the rigidity of the resulting polyurethane polymer film, thus lowering image fastness. Thus, it was found that use of a polyurethane polymer having a high acid value due to a diol having an acid group, such as DMPA or DMBA, in an ink can improve ink ejection stability but lowers image fastness.

The present inventors found that a factor in the markedly poor image fastness by the use of a polyurethane polymer having a high acid value or high hydrophilicity is greatly related to the structure of the polyurethane polymer. The present inventors also found that the polyurethane polymer must be designed particularly in terms of the two segment structures, the hard segment and the soft segment, which are characteristic of the polyurethane polymer, rather than changing the hydrophilicity and hydrophobicity of the polyurethane polymer with respect to its acid value.

In consideration of these results, the present inventors examined various polyurethane polymers and found that it is important to use at least one diol having an acid group selected from DMPA and DMBA as a compound having an acid group used in the synthesis of the polyurethane polymer. It is also important that the acid value of the polyurethane polymer resulting from the unit(s) derived from the diol having an acid group is 40 mgKOH/g or more and 140 mgKOH/g or less and that a polyether polyol having no acid group and a number-average molecular weight of 450 or more and 4,000 or less is used as a polyol. The reasons for these are described below in detail.

In general, a polyester polyol, a polyether polyol, a polycarbonate diol, or a polycaprolactone polyol is used as a polyol in the synthesis of the polyurethane polymer. Among these, a polyether polyol is very flexible. Thus, even when a diol having an acid group is used in the synthesis of the polyurethane polymer, a soft segment composed of a polyether polyol rarely causes a reduction in flexibility due to a decrease in the number of soft segments as described above. Thus, even with a somewhat high acid value, the polyurethane polymer can have high flexibility. The present inventors found that when the acid value of the polyurethane polymer resulting from the unit(s) derived from the diol having an acid group is 140 mgKOH/g or less the polyurethane polymer can have high flexibility and excellent image fastness. On the other hand, when the acid value of the polyurethane polymer resulting from the unit(s) derived from the diol having an acid group is less than 40 mgKOH/g, the prerequisite ink ejection stability may be lowered. Thus, when a polyether polyol and a diol having an acid group are used, the acid value of the polyurethane polymer resulting from the unit(s) derived from the diol having an acid group must be 40 mgKOH/g or more and 140 mgKOH/g or less.

It is also found that the flexibility of the polyether polyol also greatly depends on its molecular weight. The present inventors studied the molecular weight of the polyether polyol and found that the polystyrene-equivalent number-average molecular weight of the polyether polyol must be 450 or more and 4,000 or less as determined by gel permeation chromatography (GPC). When the polyether polyol has a molecular weight of less than 450, the polyether polyol has low flexibility because of its short molecular chain, and the resulting polyurethane polymer has low flexibility relative to its strength. On the other hand, when the polyether polyol has a molecular weight of more than 4,000, the polyether polyol has excessively high flexibility because of its long molecular chain, and the resulting polyurethane polymer has low strength relative to its flexibility. In both cases, the polyurethane polymer has a poor balance between strength and flexibility, resulting in low scratch resistance and highlighter resistance of an image.

The polyurethane polymer described above can be used to significantly improve ink ejection stability and image fastness (scratch resistance and highlighter resistance). However, the present inventors found that the ejection of such a polyurethane polymer through an ink jet recording head may cause another problem of face wetting, which results in image deflection.

The present inventors examined various polyurethane polymers and found that a polyurethane polymer having a larger number of urea bonds more frequently causes face wetting. This is probably because two N—H bonds of one urea bond interact with a face to deposit the polyurethane polymer on the face.

On the basis of these findings, polyurethane polymers having different molar ratios of the urethane bond to the urea bond were examined for image deflection. As a result, it was found that a polyurethane polymer that has the structure described above and a smaller number of urea bonds less frequently causes image deflection. More specifically, the ratio of the percentage (% by mole) of the urethane bond to the percentage (% by mole) of the urea bond in the polyurethane polymer must be 85.0/15.0 or more and 100.0/0 or less. A method for controlling the molar ratio will be described below.

It was also found that use of a polyurethane polymer that has a smaller number of urea bonds can further improve ink ejection stability. This is probably because a decrease in the number of hydrogen bonds formed by the urea bonds results in weaker intramolecular or intermolecular interaction of the polymer and an increase in the degree of freedom of the polymer molecule in the ink, which facilitates the addition of a water molecule to an acid group of the polymer molecule, thereby increasing hydrophilicity. Although the urethane bond can also form the hydrogen bond, its hydrogen bond strength is smaller than that of the urea bond. Thus, the urethane bond does not prevent the addition of water molecule to an acid group of the polymer molecule.

In addition to the use of such a polyurethane polymer that has a smaller number of urea bonds, use of a self-dispersing pigment can achieve high optical density, as well as high scratch resistance and highlighter resistance of an image. The present inventors believe the reason for that is as follows.

In general, self-dispersing pigments have a higher pigment aggregation speed associated with water evaporation than polymer-dispersed pigments. Thus, a self-dispersing pigment aggregates rapidly on a recording medium. Pigment particles remaining on the surface of the recording medium can yield a high optical density.

A urea bond of the polyurethane polymer can easily form a hydrogen bond with a functional group of a self-dispersing pigment particle. The polyurethane polymer interacting with the surface of the self-dispersing pigment particle can function as a polymer dispersant and stabilize the dispersion of the self-dispersing pigment. This prevents rapid aggregation of the self-dispersing pigment on the recording medium. Thus, high optical density intrinsic to the self-dispersing pigment cannot be achieved. Use of a polyurethane polymer that has a smaller number of urea bonds can reduce the interaction between the surface of a pigment particle and the polyurethane polymer, thus allowing rapid aggregation of the pigment on the recording medium. The self-dispersing pigment can therefore exhibit its intrinsic high optical density.

Thus, these constituents can synergistically produce their effects to achieve the advantages of the present invention.

Ink Jet Ink

The components of an ink jet ink according to an embodiment of the present invention will be described below.

Polyurethane Polymer

A polyurethane polymer for use in an ink according to an embodiment of the present invention will be described below in detail.

Polyisocyanate

The term "polyisocyanate", as used herein, refers to a compound having two or more isocyanate groups. Examples of the polyisocyanate for use in an embodiment of the present invention include, but are not limited to, aliphatic polyisocyanates, alicyclic polyisocyanates, aromatic polyisocyanates, and araliphatic polyisocyanates. The percentage (% by mass) of the unit(s) derived from the polyisocyanate in the polyurethane polymer may be 10% by mass or more and 80% by mass or less.

Examples of the aliphatic polyisocyanate include, but are not limited to, tetramethylene diisocyanate, dodecamethylene diisocyanate, hexamethylene diisocyanate, 2,2,4-trimethylhexamethylene diisocyanate, 2,4,4-trimethylhexamethylene diisocyanate, lysine diisocyanate, 2-methylpentane-1,5-diisocyanate, and 3-methylpentane-1,5-diisocyanate. Examples of the alicyclic polyisocyanate include, but are not limited to, isophorone diisocyanate, hydrogenated xylylene diisocyanate, 4,4-dicyclohexylmethane diisocyanate, 1,4-cyclohexane diisocyanate, methylcyclohexylene diisocyanate, and 1,3-bis(isocyanatomethyl)cyclohexane. Examples of the aromatic polyisocyanate include, but are not limited to, tolylene diisocyanate, 2,2-diphenylmethane diisocyanate, 2,4-diphenylmethane diisocyanate, 4,4-diphenylmethane diisocyanate, 4,4-dibenzyl diisocyanate, 1,5-naphthylene diisocyanate, xylylene diisocyanate, 1,3-phenylene diisocyanate, and 1,4-phenylene diisocyanate. Examples of the araliphatic polyisocyanate include, but are not limited to, dialkyldiphenylmethane diisocyanate, tetraalkyldiphenylmethane diisocyanate, and alpha,alpha,alpha,alpha-tetramethylxylylene diisocyanate. These polyisocyanates may be used alone or in combination. Among these polyisocyanates, hexamethylene diisocyanate may be used in an embodiment of the present invention. Hexamethylene diisocyanate may be used in combination with another polyisocyanate. The reason for this is described below.

Hexamethylene diisocyanate (hereinafter referred to as HDI) has a straight chain structure, small steric hindrance, and high molecular symmetry. In a polyurethane polymer synthesized using HDI, therefore, HDI molecules tend to gather because of hydrogen bonds formed by urethane bonds. Thus, in the polyurethane polymer synthesized using HDI, hard segments containing the polyisocyanate are localized. This tends to result in micro phase separation in which the hard segments are present in a continuous soft segment to form a sea-island structure, thus markedly increasing the flexibility of the polyurethane polymer. In contrast, a polyisocyanate that has an intramolecular branched or ring structure has large steric hindrance and rarely forms a hydrogen bond. However, an interaction between the ring structures and hydrophobic interaction increase the number of hard segments and markedly increase the strength of the polyurethane polymer. Thus, use of HDI and another polyisocyanate in combination imparts flexibility due to HDI and strength due to that other polyisocyanate to the polyurethane polymer, thereby achieving higher scratch resistance and highlighter resistance of an image.

The percentage (% by mole) constituted by the unit(s) derived from HDI with respect to all the units derived from the polyisocyanate in the polyurethane polymer may be 10% by mole or more and 90% by mole or less. The balance of the effect of improving strength and flexibility between HDI and the polyisocyanate other than HDI is satisfactory within this range. This further improves the scratch resistance and highlighter resistance of an image.

Polyether Polyol Having No Acid Group

As described above, the polyether polyol having no acid group for use in an embodiment of the present invention has a polystyrene-equivalent number-average molecular weight of 450 or more and 4,000 or less as determined by GPC. The percentage (% by mass) of the unit(s) derived from the polyether polyol having no acid group in the polyurethane polymer may be 0.1% by mass or more and 80.0% by mass or less. In one embodiment of the present invention, the polyether polyol having no acid group may be used in combination with another polyol having no acid group other than the polyether polyol to synthesize the polyurethane polymer. In this case, the percentage (% by mole) constituted by the unit(s) derived from the polyether polyol having no acid group with respect to all the units derived from the polyol having no acid group in the polyurethane polymer may be 80% by mole or more and 100% by mole or less. In particular, no castor-oil-modified polyol may be used in view of ink ejection stability.

Examples of the polyether polyol include, but are not limited to, poly(alkylene glycol)s and addition polymers of alkylene oxides and dihydric alcohols or at least trivalent polyhydric alcohols. Examples of the poly(alkylene glycol)s include, but are not limited to, poly(ethylene glycol), poly(propylene glycol), poly(tetramethylene glycol), poly(1,2-butylene glycol), poly(1,3-butylene glycol), and ethylene glycol-propylene glycol copolymers. Examples of the dihydric alcohols include, but are not limited to, hexamethylene glycol, tetramethylene glycol, ethylene glycol, diethylene glycol, propylene glycol, dipropylene glycol, 1,3-butanediol, 1,4-butanediol, 4,4-dihydroxyphenylpropane, and 4,4-dihydroxyphenylmethane. Examples of the at least trivalent polyhydric alcohols include, but are not limited to, glycerin, trimethylolpropane, 1,2,5-hexanetriol, 1,2,6-hexanetriol, and pentaerythritol. Examples of the alkylene oxides include, but are not limited to, ethylene oxide, propylene oxide, butylene oxide, and alpha-olefin oxides. These polyether polyols may be used alone or in combination.

In one embodiment of the present invention, the polyether polyol having no acid group may contain at least one selected from poly(ethylene glycol), poly(propylene glycol), poly(1,2-butylene glycol), and poly(1,3-butylene glycol). Use of these polyether polyols can increase the strength, flexibility, and hydrophilicity of the polyurethane polymer, thereby further improving the scratch resistance and highlighter resistance of an image and ink ejection stability. The percentage (% by mole) constituted by the unit(s) derived from poly(ethylene glycol), poly(propylene glycol), poly(1,2-butylene glycol), and poly(1,3-butylene glycol) with respect to all the units derived from the polyether polyol in the polyurethane polymer may be 80% by mole or more and 100% by mole or less. In particular, the polyether polyol having no acid group may contain poly(propylene glycol). Use of poly(propylene glycol) can improve the balance between the strength and the flexibility of the polyurethane polymer film.

Diol Having Acid Group

A polyurethane polymer for use in an ink according to an embodiment of the present invention has a unit derived from at least one selected from DMPA and DMBA as a diol having an acid group. The diol having an acid group may be in the form of a salt with an alkali metal, such as Li, Na, or K, or an organic amine, such as ammonia or dimethylamine. These diols may be used alone or in combination. The percentage (% by mass) of the unit(s) derived from the diol having an acid group in the polyurethane polymer may be 5.0% by mass or more and 40.0% by mass or less.

Chain Extension Agent

A chain extension agent is a compound that can react with a residual isocyanate group of a polyisocyanate unit of a urethane prepolymer. The residual isocyanate group is an isocyanate group that did not form a urethane bond. In one embodiment of the present invention, a chain extension agent may be used in the synthesis of the polyurethane polymer provided that the molar ratio of the urethane bond to the urea bond in the polyurethane polymer is 85.0/15.0 or more and 100.0/0 or less. Examples of the chain extension agent include, but are not limited to, polyvalent amine compounds, such as trimethylolmelamine and derivatives thereof, dimethylolurea and derivatives thereof, dimethylolethylamine, diethanolmethylamine, dipropanolethylamine, dibutanolmethylamine, ethylenediamine, propylenediamine, diethylenetriamine, hexylenediamine, triethylenetetramine, tetraethylenepentamine, isophoronediamine, xylylenediamine, diphenylmethanediamine, hydrogenated diphenylmethanediamine, and hydrazine, polyamide polyamine, and polyethylene polyimine. Examples of the chain extension agent also include, but are not limited to, ethylene glycol, propylene glycol, 1,3-propanediol, 1,3-butanediol, 1,4-butanediol, 1,5-pentanediol, 1,6-hexanediol, neopentyl glycol, diethylene glycol, triethylene glycol, tetraethylene glycol, dipropylene glycol, tripropylene glycol, poly(ethylene glycol), 3-methyl-1,5-pentanediol, 2-butyl-2-ethyl-1,3-propanediol, 1,4-cyclohexanediol, 1,4-cyclohexanedimethanol, hydrogenated bisphenol A, glycerin, trimethylolpropane, and pentaerythritol. These chain extension agents may be used alone or in combination.

Cross-linker

A polyurethane polymer for use in an ink according to an embodiment of the present invention may be a cross-linked polyurethane polymer. The cross-linked polyurethane polymer may be produced by using an at least trifunctional polyisocyanate, polyol, or chain extension agent, which functions as a cross-linker.

The cross-linked polyurethane polymer is rich in the hard segment of the micro phase separation structure of the polyurethane polymer. This is because use of, for example, a trifunctional cross-linker results in the formation of three urethane bonds per cross-linker. This markedly increases the strength of the polyurethane polymer. This also increases the number of adjacent urethane bonds and accordingly the number of hydrogen bonds between the urethane bonds. Consequently, the hard segments gather more closely and easily undergo micro phase separation to form a sea-island structure, maintaining high flexibility of the polyurethane polymer. Thus, the cross-linked polyurethane polymer has very high strength and high flexibility and improves the scratch resistance and highlighter resistance of an image.

Examples of at least trifunctional compound that can be used as a cross-linker in an embodiment of the present invention include, but are not limited to, at least trifunctional polyisocyanates, at least trifunctional polyols, and at least trifunctional chain extension agents. The cross-linked polyurethane polymer can be synthesized using at least one selected from the at least trifunctional compounds. Examples of the at least trifunctional polyisocyanates include, but are not limited to, polyisocyanurates, adduct-type polyisocyanates, and biuret polyisocyanates. Examples of the at least trifunctional polyols include, but are not limited to, glycerin, trimethylolpropane, 1,2,5-hexanetriol, 1,2,6-hexanetriol, pentaerythritol, polyoxypropylenetriol, and glycol adducts of the polyether polyols described above. Examples of the at least trifunctional chain extension agent include, but are not limited to, trimethylolmelamine, diethylenetriamine, triethylenetetramine, and tetraethylenepentamine. In particular, at least one selected from glycerin, trimethylolpropane, pentaerythritol, and polyoxypropylenetriol may be used.

Method for Determining Whether Cross-linked Polyurethane Polymer or Not

The present inventors found that whether the polyurethane polymer is a cross-linked polyurethane polymer or not can be determined by gel fraction. When a polyurethane polymer is dissolved in a solvent, the gel fraction of the polyurethane polymer is the ratio of the mass of residual gel (a cross-linked structure remains as gel) to the mass of the polyurethane polymer before dissolved in the solvent. The gel fraction can be measured by the solubility of a polyurethane polymer film in a solvent and is a measure of the degree of cross-linking. A polyurethane polymer having a higher degree of cross-linking has a higher gel fraction. In one embodiment of the present invention, the gel fraction is measured by the following method to determine whether the polyurethane polymer is a cross-linked polyurethane polymer or not.

A film of a polyurethane polymer extracted by a method described below is immersed in tetrahydrofuran (THF) at 23 degrees Celsius for 24 hours. The mass (A) of a THF-insoluble fraction of the polyurethane polymer film is measured and is divided by the mass (B) of the polyurethane polymer film before immersion to calculate a THF gel fraction (A/B× 100). In one embodiment of the present invention, a polyurethane polymer having a THF gel fraction of 88% by mass or more and 100% by mass or less is considered to be a cross-linked polyurethane polymer.

Molar Ratio of Urethane Bond to Urea Bond

As described above, the ratio of the percentage (% by mole) of the urethane bond to the percentage (% by mole) of the urea bond in the polyurethane polymer for use in an ink according to an embodiment of the present invention is 85.0/15.0 or more and 100.0/0 or less. In one embodiment of the present invention, the molar ratio of the urethane bond to the urea bond may be 85.0/15.0 or more and 98.5/1.5 or less. When the molar ratio of the urethane bond to the urea bond is 98.5/1.5 or less, the scratch resistance and highlighter resistance of an image are further improved.

In one embodiment of the present invention, the molar ratio of the urethane bond to the urea bond of the polyurethane polymer may be controlled by either of the following two methods.

In accordance with a first method, the amount of amine compound used in the synthesis of the polyurethane polymer is controlled. This is because the amine compound reacts with an isocyanate group to form a urea bond. The amine compound may be an amine chain extension agent. More specifically, the polyurethane polymer may be synthesized by the following method. First, polyurethane polymers are synthesized using different amounts of an amine compound. The molar ratio of the urethane bond to the urea bond of each of the polyurethane polymers is measured by the method described below. On the basis of these results, the correlation between the amount of amine compound used and the molar ratio of the urethane bond to the urea bond is examined to determine the amounts of raw materials for a polyurethane polymer having a desired molar ratio of the urethane bond to the urea bond. The reason that the correlation between the amount of amine compound used and the molar ratio is examined in advance is as follows. Even with the same amine compound, use of different types of other raw materials may result in a change in the reaction rate or the like, yielding polyurethane polymers having different molar ratios of the urethane bond to the urea bond.

In accordance with a second method, the percentage of the unreacted isocyanate group is controlled in phase inversion of the polyurethane polymer to water. Water reacts with an isocyanate group to form a urea bond. More specifically, the polyurethane polymer is synthesized by the following method. First, the percentage of the unreacted isocyanate group in the synthesis of the polyurethane polymer is measured with a Fourier transform infrared spectrophotometer (FT-IR). When the percentage of the unreacted isocyanate group reaches the desired molar ratio of the urethane bond to the urea bond, ion-exchanged water is added to the reaction system. For example, in the synthesis of a polyurethane polymer having a molar ratio of the urethane bond to the urea bond of 95.0/5.0, ion-exchanged water is added when the percentage of the unreacted isocyanate group is 5% by mole. The percentage of the unreacted isocyanate group may be controlled by the reaction time or the initial amount of polyisocyanate. In the examples described below, the molar ratio of the urethane bond to the urea bond of the polyurethane polymer was controlled by the second method.

Characteristics of Polyurethane Polymer

The percentage (% by mass) of the polyurethane polymer for use in an ink according to an embodiment of the present invention may be 0.1% by mass or more and 10.0% by mass or less of the total mass of the ink Less than 0.1% by mass of the polyurethane polymer may have an insufficient effect of improving the scratch resistance and highlighter resistance of an image. More than 10.0% by mass of the polyurethane polymer may have an insufficient effect of improving ink ejection stability. The ink may further contain another polymer without compromising the advantages of the present invention.

The ratio of the polyurethane polymer content (% by mass) of the ink to the self-dispersing pigment content (% by mass) based on the total mass of the ink described below may be 0.05 or more and 2.00 or less. A mass ratio of less than 0.05 may result in an insufficient effect of improving the scratch resistance and highlighter resistance of an image. When the mass ratio is more than 2.00, this may result in an insufficient effect of improving ink ejection stability.

A polyurethane polymer for use in an ink according to an embodiment of the present invention may have a polystyrene-equivalent weight-average molecular weight (Mw) of more than 30,000 and 150,000 or less as determined by GPC. When the polystyrene-equivalent weight-average molecular weight (Mw) is 30,000 or less, the polyurethane polymer may have low strength and an insufficient effect of improving the scratch resistance and highlighter resistance of an image. When the polystyrene-equivalent weight-average molecular weight (Mw) is more than 150,000, the ink tends to have a high viscosity, and this may result in an insufficient effect of improving ink ejection stability.

A polyurethane polymer for use in an ink according to an embodiment of the present invention may have an acid value of 40 mgKOH/g or more and 150 mgKOH/g or less. As described above, the acid value of the polyurethane polymer resulting from the unit(s) derived from the diol having an acid group must be 40 mgKOH/g or more and 140 mgKOH/g or less. The acid value of the polyurethane polymer resulting from the unit(s) derived from the diol having an acid group may be 45 mgKOH/g or more and 100 mgKOH/g or less.

Method for Synthesizing Polyurethane Polymer

A method for synthesizing a polyurethane polymer according to an embodiment of the present invention may be any known method, including the following method. A polyisocyanate, a polyol having no acid group, and a diol having an acid group are allowed to react to synthesize a urethane prepolymer having a terminal isocyanate group. An acid group of the urethane prepolymer is then neutralized with a neutralizing agent. The neutralized urethane prepolymer is further allowed to react in an aqueous solution containing a chain extension agent or a cross-linker. An organic solvent remaining in the system, if any, may be removed.

The present inventors found that, when two polyisocyanates (a first polyisocyanate and a second polyisocyanate) are used to synthesize a polyurethane polymer having a decreased number of urea bonds, a high-molecular-weight polyurethane polymer can be produced by the following method while the molar ratio of the urethane bond to the urea bond is controlled. More specifically, the first polyisocyanate, a polyol having no acid group, and a diol having an acid group are allowed to react. The reaction is continued until the percentage of the unreacted isocyanate group in the reaction system becomes zero as measured with an FT-IR, yielding a prepolymer solution. This prepolymer contains no isocyanate group of the first polyisocyanate. The second polyisocyanate is added to the prepolymer solution and is allowed to react until the percentage of the unreacted isocyanate group in the reaction system reaches a desired value as measured with an FT-IR. A chain extension agent or a cross-linker is then added to the prepolymer solution and is allowed to react to yield a polyurethane polymer solution. The phase inversion of the polyurethane polymer solution to water yields a polyurethane polymer dispersion having a desired molar ratio of the urethane bond to the urea bond. In this synthesis method, when the first polyisocyanate is isophorone diisocyanate, the scratch resistance and highlighter resistance of an image are improved. Whether a polyurethane polymer is synthesized by this synthesis method or not may be determined by the following method. When the molar ratio X of the urethane bond formed between the first polyisocyanate and the diol having an acid group to the first polyisocyanate is larger than the molar ratio Y of the urethane bond formed between the second polyisocyanate and the diol having an acid group to the second polyisocyanate, the polyurethane polymer is considered to be synthesized by the synthesis method described above. X and Y can be determined by nuclear magnetic resonance (NMR) as described below.

Method for Analyzing Polyurethane Polymer

The composition, the molecular weight, and the acid value of the resulting polyurethane polymer can be analyzed by examining the sediment and the supernatant liquid after the centrifugation of the ink Since the pigment is insoluble in organic solvents, the polyurethane polymer can also be isolated by solvent extraction. Although the ink itself can be analyzed, the isolation of the polyurethane polymer can improve the accuracy of measurement. More specifically, after the centrifugation of the ink at 80,000 rpm, the supernatant liquid is precipitated with hydrochloric acid and is dried.

(1) Polyurethane Polymer Composition

The dried precipitate is dissolved in deuterated dimethyl sulfoxide (deuterated DMSO) and is subjected to proton nuclear magnetic resonance ($^1$H-NMR). The types of the polyisocyanate, the polyether polyol having no acid group, and the diol having an acid group can be determined by the peak positions of the proton nuclear magnetic resonance and the measurement of the dried precipitate by pyrolysis-gas chromatography. The component ratio can be calculated from the ratio of the integral values of chemical shift peaks. The percentage constituted by the unit(s) derived from HDI with respect to all the units derived from the polyisocyanate in the polyurethane polymer can be calculated by this method.

(2) Method for Measuring Molar Ratio of Urethane Bond to Urea Bond of Polyurethane Polymer The molar ratio of the urethane bond to the urea bond of the polyurethane polymer can be determined by the ratio of the integral value of the peaks of the urethane bond to the integral value of the peaks of the urea bond of the polyurethane polymer precipitate dissolved in deuterated DMSO measured by carbon nuclear magnetic resonance ($^{13}$C-NMR). The peak positions of the urethane bond and the urea bond depend on the types of raw material compounds of the polyurethane polymer (a polyisocyanate, a polyether polyol having no acid group, and a diol having an acid group). Thus, the peak positions of the urethane bond and the urea bond for the raw material compounds of the polyurethane polymer must be examined by the following method.

First, the raw material compounds of the polyurethane polymer (a polyisocyanate, a polyether polyol having no acid group, and a diol having an acid group) are prepared. (i) A reaction product between the polyisocyanate and the polyether polyol having no acid group, (ii) a reaction product between the polyisocyanate and the diol having an acid group, and (iii) a reaction product between the polyisocyanate and water are obtained. Each of the products is then dried, is dissolved in deuterated DMSO, and is subjected to $^{13}$C-NMR measurement. The peak position of the urethane bond in each of the reaction products can be identified from the results for (i) and (ii). The peak position of the urea bond in each of the reaction products can be identified from the result for (iii). For example, when the polyisocyanate is isophorone diisocyanate, the peak position of the urethane bond is approximately 155 ppm, and the peak position of the urea bond is approximately 158 ppm.

(3) Method for Measuring Acid Value of Polyurethane Polymer

The acid value of the polyurethane polymer can be measured by titrimetry. In the examples described below, the acid value of the polyurethane polymer was measured by potentiometric titration of the polymer dissolved in THF with an automatic potentiometric titrator AT510 (manufactured by Kyoto Electronics Manufacturing Co., Ltd.) using a potassium hydroxide-ethanol titrant.

The acid value of the diol having an acid group (DMPA or DMBA) can be measured by the following method. First, a polyurethane polymer precipitate dissolved in deuterated DMSO is subjected to $^{13}$C-NMR measurement. The molar ratio of DMPA or DMBA to another compound having an acid group (for example, acrylic acid) is calculated by the ratio of the peak of the quaternary carbon atom of DMPA or DMBA to the integral value of the peak of an acid group of that other compound. The acid value of the polyurethane polymer is multiplied by the molar ratio of DMPA or DMBA to calculate the acid value of the diol having an acid group, DMPA or DMBA. The peak position of the quaternary carbon atom of DMPA or DMBA is approximately 65 or 60 ppm, respectively. When no compound having an acid group other than DMPA or DMBA is used, the acid value of the diol having an acid group can be measured by the titrimetry.

(4) Method for Measuring Average Molecular Weight of Polyurethane Polymer

The average molecular weight of the polyurethane polymer can be measured by GPC. In GPC measurement, an apparatus Alliance GPC 2695 (manufactured by Waters), four columns of Shodex KF-806M (manufactured by Showa Denko K.K.) in series, and a RI (refractive index) detector were used. The average molecular weight was calculated using polystyrene standard samples PS-1 and PS-2 (manufactured by Polymer Laboratories).

(5) Method for Measuring Number-average Molecular Weight of Polyether Polyol Having No Acid Group The polyurethane polymer dissolved in deuterated DMSO can be subjected to carbon nuclear magnetic resonance ($^{13}$C-NMR) to calculate the number of polyether polyol units having no acid group and the number-average molecular weight of the polyether polyol.

Self-dispersing Pigment

An ink according to an embodiment of the present invention contains a self-dispersing pigment in which at least one hydrophilic group is bonded to the surface of the pigment particle directly or through another atomic group. The at least one hydrophilic group in the ink may be partly or entirely dissociated.

Examples of the pigment for use in an ink according to an embodiment of the present invention include, but are not limited to, inorganic and organic pigments, such as carbon black. Any known pigment can be used in an ink jet ink according to an embodiment of the present invention. The present inventors found that the polyurethane polymer is physically adsorbed on inorganic pigments more easily than organic pigments. Use of inorganic pigments therefore more effectively improves the scratch resistance and highlighter resistance of an image. The self-dispersing pigment content (% by mass) of the ink is 0.1% by mass or more and 15.0% by mass or less, preferably 1.0% by mass or more and 8.0% by mass or less, of the total mass of the ink. A self-dispersing pigment content of less than 1.0% by mass may result in insufficient optical density. A self-dispersing pigment content of more than 8.0% by mass may result in poor ink jet characteristics, such as sticking resistance.

Examples of the self-dispersing pigment include, but are not limited to, pigments having a hydrophilic group on the surface of the pigment particle (self-dispersing pigments modified with hydrophilic groups) and pigments having a polymer organic group on the surface of the pigment particle (polymer-attached self-dispersing pigments). Use of the self-dispersing pigment can obviate the necessity for the addition of a dispersant to disperse the pigment in the ink or can reduce the amount of dispersant. In one embodiment of the present invention, the self-dispersing pigment modified with hydrophilic groups can be used. The pigment can be self-dispersing carbon black. Self-dispersing carbon black can promote a change in the state of the ink (an increase in viscosity, the association or aggregation of a coloring material, or the like) as the ink dries on a recording medium. Thus, self-dispersing carbon black is very effective in achieving high optical density.

Self-dispersing Pigments Modified with Hydrophilic Groups

The hydrophilic group on the surface of the pigment particle may be an anionic group, such as —COOM, —SO$_3$M, —PO$_3$HM, or —PO$_3$M$_2$, wherein "M" denotes a hydrogen atom, an alkali metal, ammonium, or an organic ammonium. When "M" is an alkali metal, such as lithium, sodium, or potassium, the ink has excellent ejection stability. The hydrophilic group may be bonded to the surface of the pigment particle directly or via another atomic group (—R—). The atomic group (—R—) may be a linear or branched alkylene group having 1 to 12 carbon atoms, an arylene group, such as a phenylene group or a naphthylene group, an amide group, a sulfonyl group, an amino group, a carbonyl group, an ester group, or an ether group, or a combination thereof.

Polymer-attached Self-dispersing Pigment

A polymer used in a polymer-attached self-dispersing pigment may be any known polymer used in ink jet inks, for example, an acrylic acid polymer. A polymer attached to the pigment preferably has a polystyrene-equivalent weight-average molecular weight in the range of 1,000 to 12,000, more preferably 3,000 to 8,000, as determined by GPC. The polymer preferably has an acid value of 50 mgKOH/g or more and 300 mgKOH/g or less, more preferably 120 mgKOH/g or more and 250 mgKOH/g or less.

Aqueous Medium

An ink according to an embodiment of the present invention may contain water or an aqueous medium, such as a mixed solvent of water and a water-soluble organic solvent. The amount (% by mass) of water-soluble organic solvent in the ink may be 3.0% by mass or more and 50.0% by mass or less of the total mass of the ink. The water-soluble organic solvent may be any known solvent generally used in ink jet inks. Examples of the water-soluble organic solvent include, but are not limited to, alkyl alcohols having 1 to 4 carbon atoms, amides, ketones, keto-alcohols, ethers, poly(alkylene glycol)s, glycols, alkylene glycols in which the alkylene group has 2 to 6 carbon atoms, polyhydric alcohols, alkyl ether acetates, alkyl ethers of polyhydric alcohols, nitrogen-containing compounds, and sulfur-containing compounds. These water-soluble organic solvents may be used alone or in combination. Water can be deionized water (ion-exchanged water). The water content (% by mass) of the ink may be 50.0% by mass or more and 95.0% by mass or less of the total mass of the ink. The ink viscosity at 25 degrees Celsius may be 6 cps or less. The ink viscosity can be controlled through the composition and the amount of the aqueous medium. An ink viscosity of more than 6 cps at 25 degrees Celsius may result in an insufficient effect of improving ink ejection stability.

Salt

An ink according to an embodiment of the present invention can also contain a salt. The term "salt", as used herein, refers to a compound formed by neutralization between a cation and an anion. The salt in the ink may be partly or entirely dissociated. The expression "contain a salt" includes the presence of a dissociated salt. The addition of a salt to an ink according to an embodiment of the present invention can promote the agglomeration of pigment on a recording medium and significantly improve optical density.

Examples of the salt for use in an ink according to an embodiment of the present invention include, but are not limited to, combinations of the following cations and anions. Specific examples of the cations include, but are not limited to, monovalent metal ions, such as Li$^+$, Na$^+$, and K$^+$, ammonium ion, and organic ammonium ions. Examples of the anions include, but are not limited to, Cl$^-$, Br$^-$, I$^-$, ClO$^-$, ClO$_2^-$, ClO$_3^-$, ClO$_4^-$, NO$_2^-$, NO$_3^-$, SO$_4^{2-}$, CO$_3^{2-}$, HCOO$^-$, CH$_3$COO$^-$, C$_2$H$_4$(COO$^-$)$_2$, C$_6$H$_5$COO$^-$, and C$_6$H$_4$(COO$^-$)$_2$.

The salt content (% by mass) of an ink according to an embodiment of the present invention may be 0.01% by mass or more and 10.0% by mass or less of the total mass of the ink. A salt content of less than 0.01% by mass may result in an insufficient effect of improving optical density. A salt content of more than 10.0% by mass may result in an insufficient effect of improving ink storage stability.

Other Additive Agents

In addition to the components described above, an ink according to an embodiment of the present invention may further contain a water-soluble organic compound that is solid at normal temperature, for example, a polyhydric alcohol, such as trimethylolpropane or trimethylolethane, urea, or a urea derivative, such as ethylene urea. An ink according to an embodiment of the present invention may also contain an additive agent, such as a polymer other than the polyurethane polymer, a surfactant, a pH-adjusting agent, an anticorrosive, a preservative, a fungicide, an antioxidant, a reduction inhibitor, an evaporation accelerator, and/or a chelator. In the case that the ink contains a polymer other than the polyurethane polymer, the total polymer content of the ink may be 0.01% by mass or more and 10.00% by mass or less of the total mass of the ink.

Ink Cartridge

An ink cartridge according to an embodiment of the present invention includes an ink storage portion for storing an ink according to an embodiment of the present invention. The ink storage portion may include an ink chamber and a chamber for housing a negative-pressure-generating member. The ink chamber can store liquid ink. The negative-pressure-generating member can store ink by the action of a negative pressure. Alternatively, an ink cartridge according to an embodiment of the present invention may include no ink chamber and include an ink storage portion that includes a negative-pressure-generating member for storing the whole ink. Alternatively, an ink cartridge according to an embodiment of the present invention may include an ink storage portion and a recording head.

Ink Jet Recording Method

An ink jet recording method according to an embodiment of the present invention involves ejecting an ink according to an embodiment of the present invention from an ejection port of a recording head onto a recording medium by an ink jet method in response to recording signals. The ink may be ejected from an ejection port of a recording head by the action of thermal energy. In one embodiment of the present invention, the face of the recording head may be subjected to water-repellent finishing. The face of the recording head may be subjected to water-repellent finishing by any method. For example, the face of the recording head may be treated with a water repellent made of a silicone material or a fluorinated material. Examples of the water repellent include, but are not limited to, KP-801 (manufactured by Shin-Etsu Chemical Co., Ltd.), Defensa (manufactured by DIC Corp.), Cytop CTX-105,805 (manufactured by Asahi Glass Co., Ltd.), and Teflon (registered trademark) AF (manufactured by DuPont). A fluorine-containing silane compound may also be used as a water repellent. The term "recording", as used herein, includes recording on a recording medium with an ink according to an embodiment of the present invention or printing on a substrate having little permeability, such as a glass substrate, a plastic substrate, or a non-permeable film, with an ink according to an embodiment of the present invention. The recording medium may be plain paper or glossy paper. Glossy paper includes a porous ink-absorbing layer on a permeable support (such as paper). The porous ink-absorbing layer contains an inorganic pigment and a binder. Use of an ink according to an embodiment of the present invention on plain paper can particularly have the advantages of the present invention.

An ink jet recording method according to an embodiment of the present invention may include a process (A) of ejecting an ink through an ink jet recording head onto a recording medium and a process (B) of applying a liquid composition described below to the recording medium such that the liquid composition at least partly overlaps the ink. The process (A) may be followed or preceded by the process (B). The same processes may be performed twice or more; for example, the process (A), the process (B), and then the process (A), or the process (B), the process (A), and then the process (B) may be performed. In particular, performing the process (A) after the process (B) has a large effect of improving the scratch resistance and optical density of an image.

Liquid Composition

An ink according to an embodiment of the present invention may be used in combination with a liquid composition that can destabilize the dispersion of pigment in the ink and reduce the solubility of the polyurethane polymer. The pigment reacts with a reactant in the liquid composition to aggregate rapidly and remain on the surface of a recording medium, thus increasing optical density. The polyurethane polymer also reacts with a reactant in the liquid composition. This reduces the solubility of the polyurethane polymer and causes precipitation of the polyurethane polymer. Thus, the polyurethane polymer is present in the vicinity of the aggregated pigment and improves the scratch resistance and highlighter resistance of an image. The phrase "destabilize the dispersion of pigment in the ink", as used herein, means that pigment particles aggregate as a result of a reduction in electrostatic repulsion by which the pigment particles are dispersed in the ink The phrase "reduce the solubility of the polyurethane polymer", as used herein, means that the polyurethane polymer, which has been dissolved (dispersed) in the ink by the addition of a water molecule to an acid group of the polyurethane polymer (hydration), is insolubilized by the prevention of hydration.

In one embodiment of the present invention, the liquid composition may be colorless, milk white, or white so as not to affect an image recorded by the ink. Thus, the ratio Amax/Amin of the maximum absorbance Amax to the minimum absorbance Amin in a visible light wavelength in the range of 400 to 780 nm may be 1.0 or more and 2.0 or less. This means that the absorption peak is substantially absent or very small in the visible light wavelength region. A liquid composition according to an embodiment of the present invention may contain no coloring material. The absorbance may be measured after the liquid composition is diluted. This is because the maximum absorbance Amax and the minimum absorbance Amin of the liquid composition are proportional to the dilution ratio, and therefore the Amax/Amin is independent of the dilution ratio. The components of the liquid composition are described below.

Reactant

In one embodiment of the present invention, the liquid composition may contain a reactant that can destabilize the dispersion of pigment and reduce the solubility of the polyurethane polymer in the ink. More specifically, the reactant may be a polyvalent metal ion or an organic acid. The reactant content (% by mass) of the liquid composition may be 3.0% by mass or more and 20.0% by mass or less of the total mass of the liquid composition. Less than 3.0% by mass of the reactant cannot sufficiently destabilize the pigment dispersion and may have an insufficient effect of improving optical density. More than 20.0% by mass of the reactant may cause the precipitation of the reactant and result in poor ink jet characteristics.

Polyvalent Metal Ion

In one embodiment of the present invention, the polyvalent metal ion of the liquid composition may be at least divalent. Examples of the divalent metal ion include, but are not limited to, alkaline-earth metals, such as beryllium, magnesium, calcium, strontium, barium, and radium. Examples of at least trivalent metal ion include, but are not limited to, aluminum, yttrium, zirconium, iron, and other transition metal ions. In one embodiment of the present invention, the polyvalent metal ion may be added in the form of salt, such as hydroxide, chloride, or nitrate, to the liquid composition. The polyvalent metal ion may also be a dissociated ion.

In one embodiment of the present invention, at least one selected from calcium ion, aluminum ion, and yttrium ion may be used in terms of reactivity. In particular, calcium ion can be used. A nitrate may be used in terms of the solubility of the salt. One example of nitrate is calcium nitrate.

Organic Acid

The term "organic acid", as used herein, refers to an acid of an organic compound. In one embodiment of the present invention, the organic acid of the liquid composition may be a monocarboxylic acid, such as formic acid, acetic acid, propionic acid, or butyric acid; a dicarboxylic acid, such as oxalic acid, malonic acid, succinic acid, or glutaric acid; or a hydroxycarboxylic acid, such as malic acid or tartaric acid. In one embodiment of the present invention, the organic acid may be added in the form of alkali metal ion salt to the liquid composition or may also be a dissociated ion.

When the reactant is an organic acid, the liquid composition may have a pH of 3.5 or more and 5.5 or less. When the liquid composition has a pH of less than 3.5, this may result in the acid corrosion of a member of an ink jet recording apparatus. When the liquid composition has a pH of more than 5.5, this may result in an insufficient effect of improving the scratch resistance and highlighter resistance of an image. The pH of the liquid composition is measured at 25 degrees Celsius and can be measured with a common pH meter. When the reactant is an organic acid, the liquid composition may have pH-buffering action. The sentence "the liquid composition has pH-buffering action", as used herein, means that an equivalent mixture of the liquid composition and the ink has substantially the same pH as the liquid composition. The phrase "substantially the same pH as the liquid composition", as used herein, refers to a pH change of less than 0.1.

Aqueous Medium and Another Additive Agent

The liquid composition may contain water or an aqueous medium, such as a mixed solvent of water and a water-soluble organic solvent. The amount (% by mass) of water-soluble organic solvent in the liquid composition may be 3.0% by mass or more and 50.0% by mass or less of the total mass of the liquid composition. The water-soluble organic solvent may be the water-soluble organic solvent that can be used in the ink described above. Water can be deionized water (ion-exchanged water). The water content (% by mass) of the liquid composition may be 50.0% by mass or more and 95.0% by mass or less of the total mass of the liquid composition. The liquid composition may contain the additive agent(s) described above for the ink. In particular, in one embodiment of the present invention, the pH of the liquid composition may be adjusted to 3.5 or more and 5.5 or less with a pH-adjusting agent. Examples of the pH-adjusting agent include, but are not limited to, organic acids, such as acetic acid and methanesulfonic acid, inorganic acids, such as sulfuric acid and nitric acid, and bases, such as alkali metal hydroxide.

EXAMPLES

The present invention will be further described in the following examples and comparative examples. However, the present invention is not limited to these examples. Unless otherwise specified, "part" in the examples is based on mass.

The following are abbreviations.
IPDI: isophorone diisocyanate
MDI: dicyclohexylmethane diisocyanate
HDI: hexamethylene diisocyanate
PPG: poly(propylene glycol)
PEG: poly(ethylene glycol)
P(12BG): poly(1,2-butylene glycol)
P(13BG): poly(1,3-butylene glycol)
PTMG: poly(tetramethylene glycol)
PC: polycarbonate diol
PES: polyester polyol
PCL: polycaprolactone polyol
DMPA: dimethylolpropionic acid
DMBA: dimethylolbutanoic acid
TMP: trimethylolpropane
Gly: glycerin
PE: pentaerythritol
PPT: polyoxypropylenetriol (Actcol 32-160, manufactured by Takeda Pharmaceutical Co., Ltd.)
EDA: ethylenediamine Preparation of Polyurethane Polymer Dispersion Preparation of Polyurethane Polymer Dispersions PU-1 to PU-40

A polyisocyanate (A part and B part), a polyol (C part), a diol having an acid group (D part), and methyl ethyl ketone (300 parts) in a four-neck flask equipped with a thermometer, an agitator, a nitrogen inlet, and a reflux condenser were allowed to react in a nitrogen gas atmosphere at 80 degrees Celsius for six hours. A cross-linker (E part) was added to the flask and was allowed to react at 80 degrees Celsius until a desired molar ratio of the urethane bond to the urea bond was obtained while the percentage of the unreacted isocyanate group was measured with an FT-IR. The molar ratio of the urethane bond to the urea bond was controlled by the method described above in detail. After completing the reaction and cooling to 40 degrees Celsius, ion-exchanged water was added to the flask, and aqueous potassium hydroxide was added to the flask while stirring with a homomixer at a high speed. The polymer solution was heated under reduced pressure to evaporate methyl ethyl ketone, yielding polyurethane polymer dispersions PU-1 to PU-40 each having a solid content of 20% by mass and a weight-average molecular weight of 35,000 or more. Table 1 shows the preparation conditions for the polyurethane polymer dispersions. The acid value, the molar ratio of the urethane bond to the urea bond, and the gel fraction of each of the polyurethane polymers were measured by the method described above. Table 2 shows the properties of the polyurethane polymer dispersions.

Preparation of Polyurethane Polymer Dispersion PU-45

IPDI (49.5 parts), PPG (number-average molecular weight: 2,000) (103.7 parts), DMPA (28.7 parts), and methyl ethyl ketone (300 parts) in a four-neck flask equipped with a thermometer, an agitator, a nitrogen inlet, and a reflux condenser were allowed to react in a nitrogen gas atmosphere at 80 degrees Celsius for 7 hours. The percentage of the unreacted isocyanate group was zero as measured with an FT-IR. HDI (14.3 parts) was added to the flask and was allowed to react at 80 degrees Celsius. A cross-linker TMP (3.8 parts) was added to the flask and was allowed to react at 80 degrees Celsius until the molar ratio of the urethane bond to the urea bond reached 95.0/5.0 while the percentage of the unreacted isocyanate group was measured with an FT-IR. After completing the reaction and cooling to 40 degrees Celsius, ion-exchanged water was added to the flask, and aqueous potassium hydroxide was added to the flask while stirring with a homomixer at a high speed. The polymer solution was heated under reduced pressure to evaporate methyl ethyl ketone, yielding a polyurethane polymer dispersion PU-45 having a solid content of 20% by mass and a weight-average molecular weight of 50,000. The acid value, the molar ratio of the urethane bond to the urea bond, and the gel fraction of the polyurethane polymer were measured by the method described above. Table 2 shows the properties of the polyurethane polymer dispersion PU-45.

TABLE 1

Preparation conditions for polyurethane (PU) polymer dispersions

| PU polymer dispersion No. | Polyisocyanate | | | | Polyol | | | Diol having acid group | | Cross-linker | |
|---|---|---|---|---|---|---|---|---|---|---|---|
| | Type | A (parts) | Type | B (parts) | Type | Number-average molecular weight | C (parts) | Type | D (parts) | Type | E (parts) |
| PU-1  | IPDI | 32.0 | HDI | 24.2 | PPG     | 2000 | 111.2 | DMPA | 28.7 | TMP | 3.8 |
| PU-2  | MDI  | 37.5 | HDI | 24.0 | PPG     | 2000 | 106.0 | DMPA | 28.7 | TMP | 3.8 |
| PU-3  | IPDI | 31.9 | HDI | 24.1 | PPG     | 2000 | 108.5 | DMBA | 31.7 | TMP | 3.8 |
| PU-4  | IPDI | 32.9 | HDI | 24.9 | PPG     | 2000 | 110.0 | DMPA | 28.7 | Gly | 3.8 |
| PU-5  | IPDI | 31.5 | HDI | 23.9 | PPG     | 2000 | 112.1 | DMPA | 28.7 | PE  | 3.8 |
| PU-6  | IPDI | 31.5 | HDI | 23.9 | PPG     | 2000 | 112.1 | DMPA | 28.7 | PPT | 3.8 |
| PU-7  | IPDI | 32.0 | HDI | 24.2 | PPG     | 2000 | 111.2 | DMPA | 28.7 | TMP/Gly | 2.2/1.6 |
| PU-8  | IPDI | 32.0 | HDI | 24.2 | PEG     | 2000 | 111.2 | DMPA | 28.7 | TMP | 3.8 |
| PU-9  | IPDI | 32.0 | HDI | 24.2 | P(12BG) | 2000 | 111.2 | DMPA | 28.7 | TMP | 3.8 |
| PU-10 | IPDI | 32.0 | HDI | 24.2 | P(13BG) | 2000 | 111.2 | DMPA | 28.7 | TMP | 3.8 |
| PU-11 | IPDI | 32.0 | HDI | 24.2 | PTMG    | 2000 | 111.2 | DMPA | 28.7 | TMP | 3.8 |
| PU-12 | IPDI | 32.0 | HDI | 24.2 | PPG     | 2000 | 111.2 | DMPA | 28.7 | TMP | 3.8 |
| PU-13 | IPDI | 32.0 | HDI | 24.2 | PPG     | 2000 | 111.2 | DMPA | 28.7 | TMP | 3.8 |
| PU-14 | IPDI | 32.0 | HDI | 24.2 | PPG     | 2000 | 111.2 | DMPA | 28.7 | TMP | 3.8 |
| PU-15 | IPDI | 32.0 | HDI | 24.2 | PPG     | 2000 | 111.2 | DMPA | 28.7 | TMP | 3.8 |
| PU-16 | IPDI | 32.0 | HDI | 24.2 | PPG     | 2000 | 111.2 | DMPA | 28.7 | TMP | 3.8 |
| PU-17 | IPDI | 31.6 | HDI | 23.9 | PPG     | 2000 | 112.8 | DMPA | 28.7 | TMP | 3.0 |
| PU-18 | IPDI | 32.9 | HDI | 24.9 | PPG     | 2000 | 108.0 | DMPA | 28.7 | TMP | 5.7 |
| PU-19 | IPDI | 30.3 | HDI | 22.9 | PPG     | 2000 | 118.1 | DMPA | 28.7 | —   | —   |
| PU-20 | IPDI | 61.4 | HDI | 5.2  | PPG     | 2000 | 100.9 | DMPA | 28.7 | TMP | 3.8 |
| PU-21 | IPDI | 7.0  | HDI | 47.4 | PPG     | 2000 | 113.1 | DMPA | 28.7 | TMP | 3.8 |
| PU-22 | IPDI | 57.7 | HDI | 4.3  | PPG     | 2000 | 105.5 | DMPA | 28.7 | TMP | 3.8 |
| PU-23 | IPDI | 5.8  | HDI | 44.6 | PPG     | 2000 | 117.1 | DMPA | 28.7 | TMP | 3.8 |
| PU-24 | IPDI | 68.1 | —   | 0    | PPG     | 2000 | 99.4  | DMPA | 28.7 | TMP | 3.8 |
| PU-25 | IPDI | 25.3 | HDI | 19.2 | PPG     | 2000 | 132.6 | DMPA | 19.1 | TMP | 3.8 |
| PU-26 | IPDI | 27.0 | HDI | 20.4 | PPG     | 2000 | 127.3 | DMPA | 21.5 | TMP | 3.8 |
| PU-27 | IPDI | 45.5 | HDI | 34.4 | PPG     | 2000 | 68.5  | DMPA | 47.8 | TMP | 3.8 |
| PU-28 | IPDI | 59.0 | HDI | 44.6 | PPG     | 2000 | 25.7  | DMPA | 66.9 | TMP | 3.8 |
| PU-29 | IPDI | 46.9 | HDI | 35.5 | PPG     | 450  | 85.2  | DMPA | 28.7 | TMP | 3.8 |
| PU-30 | IPDI | 29.1 | HDI | 22.0 | PPG     | 4000 | 116.4 | DMPA | 28.7 | TMP | 3.8 |
| PU-31 | IPDI | 32.0 | HDI | 24.2 | PPG     | 2000 | 111.2 | DMPA | 28.7 | TMP | 3.8 |
| PU-32 | IPDI | 23.6 | HDI | 17.9 | PPG     | 2000 | 137.9 | DMPA | 16.7 | TMP | 3.8 |
| PU-33 | IPDI | 60.6 | HDI | 45.9 | PPG     | 2000 | 20.4  | DMPA | 69.3 | TMP | 3.8 |
| PU-34 | IPDI | 48.6 | HDI | 36.8 | PPG     | 400  | 82.1  | DMPA | 28.7 | TMP | 3.8 |
| PU-35 | IPDI | 28.1 | HDI | 21.2 | PPG     | 6000 | 118.2 | DMPA | 28.7 | TMP | 3.8 |
| PU-36 | IPDI | 68.1 | —   | 0    | PPG     | 2000 | 99.4  | DMPA | 28.7 | TMP | 3.8 |
| PU-37 | IPDI | 32.0 | HDI | 24.2 | PC      | 2000 | 111.2 | DMPA | 28.7 | TMP | 3.8 |
| PU-38 | IPDI | 32.0 | HDI | 24.2 | PES     | 2000 | 111.2 | DMPA | 28.7 | TMP | 3.8 |
| PU-39 | IPDI | 32.0 | HDI | 24.2 | PCL     | 2000 | 111.2 | DMPA | 28.7 | TMP | 3.8 |
| PU-40 | IPDI | 70.6 | —   | —    | PPG     | 2000 | 100.8 | DMPA | 28.6 | TMP/EDA | 4.0/3.2 |

TABLE 2

Characteristics of polyurethane (PU) polymer dispersions

| PU polymer dispersion No. | Acid value (mgKOH/g) | | Percentage constituted by | | |
|---|---|---|---|---|---|
| | Acid value of PU polymer | Acid value of PU polymer resulting from unit(s) derived from diol having acid group | Urethane bond/urea bond (molar ratio) | unit(s) derived from HDI with respect to all units derived from polyisocyanate in PU polymer (mol %) | Gel fraction (%) |
| PU-1  | 60 | 60 | 95.0/5.0  | 50 | 94 |
| PU-2  | 60 | 60 | 95.0/5.0  | 50 | 94 |
| PU-3  | 60 | 60 | 95.0/5.0  | 50 | 94 |
| PU-4  | 60 | 60 | 95.0/5.0  | 50 | 94 |
| PU-5  | 60 | 60 | 95.0/5.0  | 50 | 94 |
| PU-6  | 60 | 60 | 95.0/5.0  | 50 | 94 |
| PU-7  | 60 | 60 | 95.0/5.0  | 50 | 94 |
| PU-8  | 60 | 60 | 95.0/5.0  | 50 | 94 |
| PU-9  | 60 | 60 | 95.0/5.0  | 50 | 94 |
| PU-10 | 60 | 60 | 95.0/5.0  | 50 | 94 |
| PU-11 | 60 | 60 | 95.0/5.0  | 50 | 94 |
| PU-12 | 60 | 60 | 85.0/15.0 | 50 | 94 |

TABLE 2-continued

Characteristics of polyurethane (PU) polymer dispersions

| PU polymer dispersion No. | Acid value (mgKOH/g) | | Urethane bond/urea bond (molar ratio) | Percentage constituted by unit(s) derived from HDI with respect to all units derived from polyisocyanate in PU polymer (mol %) | Gel fraction (%) |
| --- | --- | --- | --- | --- | --- |
| | Acid value of PU polymer | Acid value of PU polymer resulting from unit(s) derived from diol having acid group | | | |
| PU-13 | 60 | 60 | 90.0/10.0 | 50 | 94 |
| PU-14 | 60 | 60 | 98.5/1.5 | 50 | 94 |
| PU-15 | 60 | 60 | 98.6/1.4 | 50 | 94 |
| PU-16 | 60 | 60 | 100.0/0 | 50 | 94 |
| PU-17 | 60 | 60 | 95.0/5.0 | 50 | 88 |
| PU-18 | 60 | 60 | 95.0/5.0 | 50 | 100 |
| PU-19 | 60 | 60 | 95.0/5.0 | 50 | 81 |
| PU-20 | 60 | 60 | 95.0/5.0 | 10 | 94 |
| PU-21 | 60 | 60 | 95.0/5.0 | 90 | 94 |
| PU-22 | 60 | 60 | 95.0/5.0 | 9 | 94 |
| PU-23 | 60 | 60 | 95.0/5.0 | 91 | 94 |
| PU-24 | 60 | 60 | 95.0/5.0 | 0 | 94 |
| PU-25 | 40 | 40 | 95.0/5.0 | 50 | 94 |
| PU-26 | 45 | 45 | 95.0/5.0 | 50 | 94 |
| PU-27 | 100 | 100 | 95.0/5.0 | 50 | 94 |
| PU-28 | 140 | 140 | 95.0/5.0 | 50 | 94 |
| PU-29 | 60 | 60 | 95.0/5.0 | 50 | 94 |
| PU-30 | 60 | 60 | 95.0/5.0 | 50 | 94 |
| PU-31 | 60 | 60 | 84.0/16.0 | 50 | 94 |
| PU-32 | 35 | 35 | 95.0/5.0 | 50 | 94 |
| PU-33 | 145 | 145 | 95.0/5.0 | 50 | 94 |
| PU-34 | 60 | 60 | 95.0/5.0 | 50 | 94 |
| PU-35 | 60 | 60 | 95.0/5.0 | 50 | 94 |
| PU-36 | 60 | 60 | 100.0/0 | 0 | 94 |
| PU-37 | 60 | 60 | 95.0/5.0 | 50 | 94 |
| PU-38 | 60 | 60 | 95.0/5.0 | 50 | 94 |
| PU-39 | 60 | 60 | 95.0/5.0 | 50 | 94 |
| PU-40 | 60 | 60 | 84.0/16.0 | 0 | 94 |
| PU-45 | 60 | 60 | 95.0/5.0 | 50 | 94 |

Preparation of Pigment Dispersion
Preparation of Pigment Dispersion A

A commercially available Cab-O-Jet 400 (manufactured by Cabot Corp.) was well stirred in water to yield a pigment dispersion A. Cab-O-Jet 400 is a self-dispersing carbon black pigment having a hydrophilic group on the surface thereof. The pigment dispersion A had a pigment content (solid content) of 15.0% by mass and a pH of 9.0. The pigment had an average particle size of 130 nm.

Preparation of Pigment Dispersion B 1.5 g of 4-amino-1,2-benzenedicarboxylic acid was added to a solution containing 5 g of concentrated hydrochloric acid dissolved in 5.5 g of water at five degrees Celsius. A vessel containing this solution was placed in an ice bath to maintain the solution at 10 degrees Celsius or less. 1.8 g of sodium nitrite dissolved in 9 g of water at five degrees Celsius was added to the solution. After the solution was stirred for 15 minutes, 6 g of carbon black was added while stirring. The carbon black had a specific surface area of 220 m$^2$/g and a DBP absorption of 105 mL/100 g. After the solution was stirred for another 15 minutes, the resulting slurry was filtered through a filter paper (trade name standard filter paper No. 2, manufactured by Advantec Toyo Kaisha, Ltd.). Particles on the filter were sufficiently washed with water. The particles were dried in an oven at 110 degrees Celsius to prepare self-dispersing carbon black. The self-dispersing carbon black was dispersed in water at a pigment content of 10.0% by mass to prepare a dispersion. This pigment dispersion contained self-dispersing carbon black having a —C$_6$H$_3$—(COONa)$_2$ group on the surface thereof. Sodium ions of the pigment dispersion were then substituted with potassium ions by an ion exchange method to prepare a pigment dispersion B. The pigment dispersion B contained carbon black having a —C$_6$H$_3$—(COOK)$_2$ group on the surface thereof. The pigment dispersion B had a pigment content (solid content) of 10.0% by mass and a pH of 8.0. The pigment had an average particle size of 80 nm.

Preparation of Pigment Dispersion C 500 g of carbon black having a specific surface area of 220 m$^2$/g and a DBP absorption of 112 mL/100 g, 45 g of aminophenyl(2-sulfoethyl)sulfone, and 900 g of distilled water in a reactor were stirred at 300 rpm at a temperature of 55 degrees Celsius for 20 minutes. 40 g of 25% by mass sodium nitrite was then added dropwise to the mixture for 15 minutes. After 50 g of distilled water was further added to the mixture, the mixture was allowed to react at 60 degrees Celsius for two hours. The resulting product was removed from the reactor while being diluted with distilled water such that the solid content was 15.0% by mass. After centrifugation and purification to remove impurities, a dispersion (1) was obtained. Carbon black in the dispersion (1) had aminophenyl(2-sulfoethyl)sulfone functional groups bonded to the surface thereof. The number of moles of functional groups bonded to carbon black in the dispersion (1) was determined as described below. The sodium ion of the dispersion (1) measured with a probe-type sodium electrode was converted into a value per mole of carbon black powder to determine the number of moles of functional groups bonded to carbon black. The dispersion (1) was then added dropwise to a pentaethylenehexamine solution for one hour with vigorous stirring while the temperature was maintained at room temperature. The pentaethylenehexamine content ranged from 1 to 10 times the number of moles of sodium ions measured above. The amount of solution was equal to the amount of dispersion (1).

After this mixture was stirred for 18 to 48 hours, the mixture was purified to yield a dispersion (2) having a solid content of 10.0% by mass. Carbon black in the dispersion (2) had pentaethylenehexamine bonded to the surface thereof.

190 g of a styrene-acrylic acid copolymer was weighed. The styrene-acrylic acid polymer had a weight-average molecular weight of 8,000, an acid value of 140 mgKOH/g, and a polydispersity Mw/Mn of 1.5 (wherein Mw denotes the weight-average molecular weight, and Mn denotes the number-average molecular weight). 1,800 g of distilled water and potassium hydroxide for neutralizing the polymer were added to dissolve the styrene-acrylic acid copolymer while stirring, yielding an aqueous styrene-acrylic acid copolymer solution. 500 g of the dispersion (2) was then added dropwise to the aqueous styrene-acrylic acid copolymer solution while stirring. This mixture of the dispersion (2) and the aqueous styrene-acrylic acid copolymer solution was transferred to an evaporating dish, was dried at 150 degrees Celsius for 15 hours, and was cooled to room temperature. The dried product was then dispersed in distilled water, which was adjusted to pH 9.0 with potassium hydroxide in advance, with a dispersing apparatus. 1.0 N aqueous potassium hydroxide was added to the dispersion while stirring to adjust the pH within the range of 10 to 11. The dispersion was then desalted and purified to remove impurities and coarse particles. Through these procedures, a pigment dispersion C containing polymer-attached carbon black dispersed in water was prepared. The pigment dispersion C had a pigment content (solid content) of 10.0% by mass and a pH of 10.1. The pigment had an average particle size of 130 nm.

Preparation of Pigment Dispersion D

A styrene-acrylic acid copolymer having an acid value of 200 mgKOH/g and a weight-average molecular weight of 10,000 was neutralized with 10% by mass aqueous potassium hydroxide. 10 parts of carbon black having a specific surface area of 210 m$^2$/g and a DBP absorption of 74 mL/100 g, 20 parts of the neutralized styrene-acrylic acid copolymer (solid content), and 70 parts of water were mixed. This mixture was dispersed with a sand grinder for one hour, was centrifuged to remove coarse particles, and was filtrated under pressure through a microfilter having a pore size of 3.0 micrometers (manufactured by FUJIFILM Co.). Through these procedures, a pigment dispersion D in which carbon black was dispersed in water by the polymer was prepared. The pigment dispersion D had a pigment content (solid content) of 10.0% by mass and a pH of 10.0. The pigment had an average particle size of 120 nm.

Preparation of Pigment Dispersion E

A pigment dispersion E in which carbon black was dispersed in water by a polyurethane polymer was prepared in the same manner as in the pigment dispersion D except that the styrene-acrylic acid copolymer was replaced by the polyurethane polymer dispersion PU-1. The pigment dispersion E had a pigment content (solid content) of 10.0% by mass and a pH of 10.0. The pigment had an average particle size of 120 nm.

Preparation of Ink

A combination of the pigment dispersion, the polyurethane polymer dispersion, and a salt shown in Tables 3 and 4 was mixed with the following components. The amount of ion-exchanged water (the remainder) was such that the total amount of the components of the ink was 100.0% by mass.

Pigment dispersion see Tables 3 and 4
Polyurethane polymer dispersion (polymer content (solid content) was 20.0% by mass) see Tables 3 and 4
Salt see Tables 3 and 4
Glycerin 9.0% by mass
Diethylene glycol 5.0% by mass
Triethylene glycol 5.0% by mass
Acetylenol (trade name) E100 (surfactant, manufactured by Kawaken Fine Chemicals Co., Ltd.) 0.1% by mass
Ion-exchanged water the remainder The mixture was well dispersed and was passed through a microfilter (manufactured by Fujifilm Corp.) having a pore size of 3.0 micrometers under pressure to prepare an ink.

TABLE 3

Preparation conditions for inks

| Example No. | Pigment dispersion No. | Pigment dispersion Content (mass %) | PU polymer dispersion No. | PU polymer dispersion Content (mass %) | PU polymer content/pigment content (times) | Salt Type | Salt Content (mass %) |
|---|---|---|---|---|---|---|---|
| Example 1 | A | 20.00 | PU-1 | 7.50 | 0.50 | — | 0 |
| Example 2 | B | 30.00 | PU-1 | 7.50 | 0.50 | — | 0 |
| Example 3 | C | 30.00 | PU-1 | 7.50 | 0.50 | — | 0 |
| Example 4 | A | 20.00 | PU-2 | 7.50 | 0.50 | — | 0 |
| Example 5 | A | 20.00 | PU-3 | 7.50 | 0.50 | — | 0 |
| Example 6 | A | 20.00 | PU-4 | 7.50 | 0.50 | — | 0 |
| Example 7 | A | 20.00 | PU-5 | 7.50 | 0.50 | — | 0 |
| Example 8 | A | 20.00 | PU-6 | 7.50 | 0.50 | — | 0 |
| Example 9 | A | 20.00 | PU-7 | 7.50 | 0.50 | — | 0 |
| Example 10 | A | 20.00 | PU-8 | 7.50 | 0.50 | — | 0 |
| Example 11 | A | 20.00 | PU-9 | 7.50 | 0.50 | — | 0 |
| Example 12 | A | 20.00 | PU-10 | 7.50 | 0.50 | — | 0 |
| Example 13 | A | 20.00 | PU-11 | 7.50 | 0.50 | — | 0 |
| Example 14 | A | 20.00 | PU-12 | 7.50 | 0.50 | — | 0 |
| Example 15 | A | 20.00 | PU-13 | 7.50 | 0.50 | — | 0 |
| Example 16 | A | 20.00 | PU-14 | 7.50 | 0.50 | — | 0 |
| Example 17 | A | 20.00 | PU-15 | 7.50 | 0.50 | — | 0 |
| Example 18 | A | 20.00 | PU-16 | 7.50 | 0.50 | — | 0 |
| Example 19 | A | 20.00 | PU-17 | 7.50 | 0.50 | — | 0 |
| Example 20 | A | 20.00 | PU-18 | 7.50 | 0.50 | — | 0 |
| Example 21 | A | 20.00 | PU-19 | 7.50 | 0.50 | — | 0 |
| Example 22 | A | 20.00 | PU-20 | 7.50 | 0.50 | — | 0 |
| Example 23 | A | 20.00 | PU-21 | 7.50 | 0.50 | — | 0 |
| Example 24 | A | 20.00 | PU-22 | 7.50 | 0.50 | — | 0 |

TABLE 3-continued

Preparation conditions for inks

| | Pigment dispersion | | PU polymer dispersion | | PU polymer | Salt | |
|---|---|---|---|---|---|---|---|
| Example No. | No. | Content (mass %) | No. | Content (mass %) | content/pigment content (times) | Type | Content (mass %) |
| Example 25 | A | 20.00 | PU-23 | 7.50 | 0.50 | — | 0 |
| Example 26 | A | 20.00 | PU-24 | 7.50 | 0.50 | — | 0 |
| Example 27 | A | 20.00 | PU-25 | 7.50 | 0.50 | — | 0 |
| Example 28 | A | 20.00 | PU-26 | 7.50 | 0.50 | — | 0 |

TABLE 4

Preparation conditions for inks

| | Pigment dispersion | | PU polymer dispersion | | PU polymer | Salt | |
|---|---|---|---|---|---|---|---|
| Example No. | No. | Content (mass %) | No. | Content (mass %) | content/pigment content (times) | Type | Content (mass %) |
| Example 29 | A | 20.00 | PU-27 | 7.50 | 0.50 | — | 0 |
| Example 30 | A | 20.00 | PU-28 | 7.50 | 0.50 | — | 0 |
| Example 31 | A | 20.00 | PU-29 | 7.50 | 0.50 | — | 0 |
| Example 32 | A | 20.00 | PU-30 | 7.50 | 0.50 | — | 0 |
| Example 33 | A | 20.00 | PU-1 | 7.50 | 0.50 | Potassium phthalate | 0.20 |
| Example 34 | A | 20.00 | PU-1 | 7.50 | 0.50 | Potassium benzoate | 0.20 |
| Example 35 | A | 20.00 | PU-1 | 7.50 | 0.50 | Potassium sulfate | 0.20 |
| Example 36 | A | 20.00 | PU-1 | 7.50 | 0.50 | Potassium citrate | 0.20 |
| Example 37 | A | 20.00 | PU-1 | 0.75 | 0.05 | — | 0 |
| Example 38 | A | 20.00 | PU-1 | 30.00 | 2.00 | — | 0 |
| Example 39 | A | 20.00 | PU-1 | 0.60 | 0.04 | — | 0 |
| Example 40 | A | 20.00 | PU-1 | 30.75 | 2.05 | — | 0 |
| Example 41 | A | 20.00 | PU-45 | 7.50 | 0.50 | — | 0 |
| Comparative example 1 | A | 20.00 | PU-31 | 7.50 | 0.50 | — | 0 |
| Comparative example 2 | A | 20.00 | PU-32 | 7.50 | 0.50 | — | 0 |
| Comparative example 3 | A | 20.00 | PU-33 | 7.50 | 0.50 | — | 0 |
| Comparative example 4 | A | 20.00 | PU-34 | 7.50 | 0.50 | — | 0 |
| Comparative example 5 | A | 20.00 | PU-35 | 7.50 | 0.50 | — | 0 |
| Comparative example 6 | D | 30.00 | PU-36 | 7.50 | 0.50 | — | 0 |
| Comparative example 7 | A | 20.00 | PU-37 | 7.50 | 0.50 | — | 0 |
| Comparative example 8 | A | 20.00 | PU-38 | 7.50 | 0.50 | — | 0 |
| Comparative example 9 | A | 20.00 | PU-39 | 7.50 | 0.50 | — | 0 |
| Comparative example 10 | D | 20.00 | PU-11 | 7.50 | 0.50 | — | 0 |
| Comparative example 11 | E | 30.00 | PU-1 | 7.50 | 0.50 | — | 0 |
| Comparative example 12 | A | 20.00 | — | 0 | 0 | — | 0 |
| Comparative example 13 | A | 20.00 | — | 0 | 0 | Potassium phthalate | 0.20 |
| Reference example 1 | D | 30.00 | PU-1 | 15.00 | 1.00 | — | 0 |
| Reference example 2 | D | 30.00 | PU-24 | 15.00 | 1.00 | — | 0 |
| Reference example 3 | A | 20.00 | PU-40 | 7.50 | 0.50 | — | 0 |

Polyurethane polymers and inks according to Comparative Examples 14 to 20 were prepared as described below.

Comparative Example 14

An ink according to Comparative Example 14, was prepared as described below with reference to Example 1 of PTL 4 (Japanese Patent Laid-Open No. 2004-285344). 35 parts of poly(tetramethylene ether) glycol, 3 parts of triethylene glycol, 16 parts of dimethylolpropionic acid, 9 parts of tetramethylenexylylene diisocyanate, and 25 parts of isophorone diisocyanate were allowed to react in acetone in a nitrogen stream to yield a urethane prepolymer. The urethane prepolymer was added dropwise and dispersed in deionized water containing 12 parts of triethylamine. The acetone was removed under vacuum to yield a polyurethane polymer dispersion PU-41. PU-41 had a solid content of 30% by mass, a weight-average molecular weight of 20,840, and an acid value of 69 mgKOH/g. 10.4 parts of a 25% by mass aqueous solution of a potassium salt of a styrene-acrylic acid copolymer Joncryl 683 (manufactured by Johnson Polymer; acid value 160 mgKOH/g, weight-average molecular weight 8,000), 71.5 parts of ion-exchanged water, 5 parts of glycerin, 0.1 parts of Proxel GXL(S) (manufactured by Avecia Ltd.), and 13 parts of carbon black MCF 88 (manufactured by Mitsubishi Chemical Corp.) were dispersed in a bead mill with 0.8-mm zirconia beads such that the average diameter of dispersed particles became 61.9 nm. After centrifugation, coarse particles were removed by a 5-micrometer filter to yield a carbon black dispersion. The carbon black dispersion was mixed with 26 parts of PU-41. 32.5 parts of triethylene glycol monobutyl ether, 32.5 parts of glycerin, 3.25 parts of Surfynol 465 (manufactured by Air Products and Chemicals, Inc.), and 130.75 parts of ion-exchanged water were added to the mixture to yield an ink according to Comparative Example 14.

Comparative Example 15

An ink according to Comparative Example 15 was prepared as described below with reference to Example 1 of PTL 2 (Japanese Patent Laid-Open No. 2008-179657). A four-neck flask equipped with a thermometer, an agitator, a nitrogen inlet, and a condenser tube was charged with 95 g of Placcel 205BA (manufactured by Daicel Chemical Industries, Ltd.), 11 g of trimethylolpropane, 120 g of methyl ethyl ketone, and 0.54 g of 1,4-diazabicyclo[2.2.2]octane. Placcel 205BA is a carboxylic-acid-modified polycaprolactone diol, in which dimethylolbutanoic acid is modified with a lactone. After agitation for 30 minutes, 74 g of isophorone diisocyanate was added to the four-neck flask. After agitation at room temperature in a nitrogen atmosphere for one hour, a reaction was performed at 70 degrees Celsius for four hours. After the reaction, the product was cooled to room temperature to yield a 60% by mass urethane prepolymer solution. 17.1 g of 50% by mass aqueous potassium hydroxide and 350 g of ion-exchanged water were added to 250 g of the urethane prepolymer solution in the four-neck flask and were stirred at room temperature for 30 minutes. The mixture was heated to 80 degrees Celsius in a nitrogen atmosphere and was subjected to a chain extension reaction for two hours. After the reaction, methyl ethyl ketone and part of water were removed with a rotatory evaporator and an aspirator. Ion-exchanged water was then added such that the amount of recovery was 429 g to yield a 35% by mass polyurethane polymer dispersion PU-42. PU-42 had an acid value of 70 mgKOH/g and a weight-average molecular weight of 47,000.

After 3 kg of carbon black MA-100 (manufactured by Mitsubishi Chemical Corp.) was mixed with 10 kg of water, the mixture was added to 4.5 kg of a sodium hypochlorite solution (available chlorine concentration 12%). After agitation at a temperature in the range of 100 to 105 degrees Celsius for 10 hours, the resulting product was filtered. Dried wet crystals were washed with water and were dried at 80 degrees Celsius to yield 2.5 kg of oxidized carbon black. The oxidized carbon black was mixed with ion-exchanged water to prepare a slurry. The slurry was dialyzed with a poly (methyl methacrylate) dialysis module Filtryzer B3-20A (manufactured by Toray Industries, Inc.) to remove sodium ions and chloride ions in the oxidized carbon black and was dried to yield dialyzed oxidized carbon black. 120 g of the dialyzed oxidized carbon black, 180 g of triethylene glycol monobutyl ether, and 700 g of ion-exchanged water were mixed in a Homo Disper agitator to prepare a slurry. A beaker containing the slurry was connected to a circulation-type bead mill DYNO-Mill KDL-A (manufactured by Willy A. Bachofen AG) through a tube. The slurry was dispersed with zirconia beads having a diameter of 0.3 mm at 1,600 rpm for three hours to prepare an aqueous black pigment dispersion. 0.7 g of 50% by mass aqueous potassium hydroxide, 0.5 g of ion-exchanged water, and 7.1 g of the polyurethane polymer dispersion PU-42 (solid content 35% by mass) were then added to 41.7 g of the aqueous black pigment dispersion to prepare an aqueous black pigment dispersion (pigment content: 10% by mass, polyurethane polymer content: 5% by mass). 25.8, g of ion-exchanged water, 3.5 g of glycerin, 1.7 g of 2-pyrrolidone, and 1.5 g of ethylene glycol were then added to 17.5 g of the aqueous black pigment dispersion to prepare an ink according to Comparative Example 15.

Comparative Example 16

An ink according to Comparative Example 16 was prepared as described below with reference to Example 1 of PTL 1 (PCT Japanese Translation Patent Publication No. 2005-515289). 6.5 parts of self-dispersing carbon black that was manufactured in accordance with International Publication WO 01/94476 and was surface-treated by ozone oxidation, 0.1 parts of a polyurethane dispersion Hybridur 580 (manufactured by Air Products and Chemicals, Inc.), 1.5 parts of a polyurethane dispersion Mace 85-302-1 (manufactured by Mace Adhesives And Coatings Company Inc.), 9.5 parts of glycerin, 6 parts of ethylene glycol, 0.8 parts of Surfynol 465 (manufactured by Air Products and Chemicals, Inc.), and 75.6 parts of water were mixed to prepare an ink according to Comparative Example 16.

Comparative Example 17

An ink according to Comparative Example 17 was prepared as described below with reference to Comparative Example 3 of PTL 3 (Japanese Patent Laid-Open No. 9-291242). 184.9 parts of poly(tetramethylene glycol) (molecular weight 3,000, hydroxyl value 38 mgKOH/g), 15.1 parts of poly(ethylene glycol) (molecular weight 2,000, hydroxyl value 56 mgKOH/g), 21.5 parts of 2,2-dimethylolpropionic acid, and 200.0, parts of methyl ethyl ketone in a reactor equipped with a thermometer, an agitator, a reflux condenser tube, and a nitrogen gas-inlet pipe were heated to 50 degrees Celsius in a nitrogen atmosphere while stirring. After the addition of 71.6 parts of isophorone diisocyanate, the mixture was allowed to react at 80 degrees Celsius for 2.5 hours to yield an isocyanate-group-containing prepolymer solution. After cooling to 30 degrees Celsius, a solution of 6.9 parts of propylene glycol and 229 parts of methyl ethyl ketone was added dropwise and was allowed to react at 70 degrees Celsius. A liquid mixture of 9.8 parts of 28% by mass aqueous ammonia and 900 parts of water was then added dropwise. The removal of the solvent yielded a polyurethane polymer dispersion PU-43 having no urea bond. PU-43 had an acid value of 30 mgKOH/g, a pH of 8.5, and a solid content of 25.0% by mass.

250.0 parts of an ethylene-acrylic acid copolymer Primacor 5983 (manufactured by Dow Chemical Japan Ltd., acid value 156 mgKOH/g, melt index 500 g/10 minutes) were neutralized with 278.6 parts of 10% by mass aqueous sodium hydroxide and 471.4 parts of ion-exchanged water and were then dissolved by heating to prepare an aqueous ethylene-acrylic acid copolymer solution having a solid content of 25% by mass and a pH of 9.0. 40.3 parts of the aqueous ethylene-acrylic acid copolymer solution and 17.3 parts of the polyurethane polymer dispersion PU-43 were mixed to prepare a polymer composition. 15.0 parts of a phthalocyanine blue pigment Lionol Blue FG-7350 (manufactured by Toyo Ink Co., Ltd.), 0.3 parts of a silicone antifoaming agent, 2.0 parts of a polyethylene wax dispersion (solid content 40% by mass), 4.5 parts of ethanol, and 20.6 parts of ion-exchanged water were then added to 57.6 parts of the polymer composition to prepare an ink according to Comparative Example 17.

Comparative Example 18

An ink according to Comparative Example 18 was prepared as described below with reference to Example 3 of Japanese Patent Laid-Open No. 2003-342502. 250 g of a commercially available carbon black MA8 (manufactured by Mitsubishi Chemical Corp.) was well dispersed in 1,000 ml of ion-exchanged water. 1,000 g of ammonium peroxodisulfate was added to the dispersion and was stirred at a temperature in the range of 60 to 70 degrees Celsius for eight hours. The slurry was desalted with an ultrafiltration membrane (manufactured by Toyo Roshi Kaisha, Ltd.) having a molecular weight cut-off of 10,000 such that the electrical conductivity of the filtrate was 0.5 ms/cm or less. The slurry was concentrated to a solid content of 20% by mass. 20 g of 25% by mass aqueous potassium hydroxide was added dropwise to adjust the pH of the slurry to 8. Thus, a self-dispersing carbon black dispersion CB-1 having a solid content of 15% by mass was prepared. The carbon black of CB-1 had an average particle size of 85 nm, a polydispersity index of 0.15, and a zeta potential of −50 mV.

A self-dispersing carbon black dispersion CB-1, an acrylamide polymer Sumirez Resin 7200A (manufactured by Sumika Chemtex Co., Ltd.), and a polyurethane polymer Superflex 150 (manufactured by Dai-ichi Kogyo Seiyaku Co., Ltd.) were mixed for 10 minutes at a mass ratio of 5.0:0.1:0.1 based on the solid content. 20% by mass of diethylene glycol and 0.10% by mass of Acetylenol (trade name) EH were then added to the mixture. Water was then added to the mixture such that the carbon black content (solid content) of the resulting ink was 5% by mass. The ink was agitated for one hour. The ink was ultrafiltered through a 3-micrometer membrane filter (manufactured by Toyo Roshi Kaisha, Ltd.) to prepare an ink according to Comparative Example 18.

Comparative Example 19

An ink according to Comparative Example 19 was prepared as described below with reference to Example 4 of Japanese Patent Laid-Open No. 2003-342502. An ink according to Comparative Example 19 was prepared in the same manner as in Comparative Example 18 except that the acrylamide polymer Sumirez Resin 7200A was replaced by Polysol Cogum 15H (manufactured by Showa Highpolymer Co., Ltd.) and the polyurethane polymer Superflex 150 was replaced by a polyurethane polymer Superflex 300.

Comparative Example 20

An ink according to Comparative Example 20 was prepared as described below with reference to Example 1 of Japanese Patent Laid-Open No. 2008-280363. 202, parts of a castor-oil-modified diol (manufactured by Hokoku Corp., number-average molecular weight 732), 32 parts of a castor-oil-modified diol (manufactured by Hokoku Corp., number-average molecular weight 431), 79 parts of dimethylolpropionic acid, 43 parts of polyoxyethylene ether glycol PEG#600 (manufactured by NOF Corp.), 13 parts of propylene glycol, 76 parts of 1,6-hexamethylene diisocyanate, 155 parts of hydrogenated MDI (dicyclohexylmethane diisocyanate), and 400 parts of methyl ethyl ketone in a reactor equipped with an agitator, a reflux condenser tube, a nitrogen inlet, and a thermometer were heated to 75 degrees Celsius. After one hour, 0.3 parts of dibutyltin laurate was added to the mixture. The mixture was kept at 75 degrees Celsius so that the isocyanate group was decreased to 0.1% by mole or less. The reaction product was then cooled to 45 degrees Celsius or less. 40 parts of 25% by mass aqueous ammonia and 1,400 parts of pure water were added while stirring for phase inversion. Methyl ethyl ketone was removed under vacuum while stirring at a temperature in the range of 20 to 60 degrees Celsius to yield a polyurethane polymer dispersion PU-44 having a solid content of 33% by mass and a pH of 6.7. 500 parts of a self-dispersing carbon black dispersion Aqua-Black 174 (manufactured by Tokai Carbon Co., Ltd., solid content 20% by mass) was added to 3 parts of the polyurethane polymer dispersion PU-44 and was stirred at room temperature for two hours to prepare an ink according to Comparative Example 20.

Evaluation 1

In the following evaluation, the criteria AAA to B refer to acceptable levels, and the criteria C and D refer to unacceptable levels. The evaluation was performed with an ink jet recording apparatus PIXUS iP3100 (manufactured by CANON KABUSHIKI KAISHA). The recording conditions included a temperature of 23 degrees Celsius, a relative humidity of 55%, and an ink droplet weight of 28 ng (within plus or minus 10%). With the ink jet recording apparatus, an image that was recorded under the conditions under which approximately 28 ng of one ink droplet was applied to a unit area of 1/600 inches*1/600 inches at a resolution of 600 dpi*600 dpi was assumed to have a print duty of 100%.

Optical Density 1

An ink cartridge filled with the ink prepared as described above was placed in the ink jet recording apparatus. A 2 cm×2 cm solid image (print duty 100%) was printed on four recording media: a PPC sheet GF-500 (manufactured by CANON KABUSHIKI KAISHA), a PPC sheet 4024 (manufactured by Xerox Co.), a PPC sheet Bright White (manufactured by Hewlett-Packard Co.), and a PPC sheet Hammermill Jet Print (manufactured by International Paper). After the solid image was left to stand for one day, the optical density was measured with a reflection densitometer Macbeth RD-918 (manufactured by Macbeth). The following are evaluation criteria for optical density. Tables 5 and 6 show the results.

AA: The average optical density of the four recording media was 1.40 or more, and the highest optical density was 1.60 or more.

A: The average optical density of the four recording media was 1.40 or more, but the highest optical density was 1.55 or more and less than 1.60.

B: The average optical density of the four recording media was 1.40 or more, but the highest optical density was less than 1.55.

C: The average optical density of the four recording media was less than 1.40.

Scratch Resistance of Image 1

An ink cartridge filled with the ink prepared as described above was placed in the ink jet recording apparatus. A 1.0 inch*0.5 inches solid image (print duty 100%) was recorded on a PPC sheet GF-500 (manufactured by CANON KABUSHIKI KAISHA). Ten minutes and one day after the recording, a Silbon paper and a weight having a contact pressure of 40 g/cm$^2$ were placed on the solid image, and the solid image and the Silbon paper were rubbed together. After the Silbon paper and the weight were removed, smudges on the solid image and a transfer to the white ground of the Silbon paper were visually inspected. The following are evaluation criteria for the scratch resistance of an image. Tables 5 and 6 show the results.

AAA: No smudge on the white ground was observed in the test after 10 minutes and the test after one day.

AA: Little smudge on the white ground was observed in the test after 10 minutes, and no smudge on the white ground was observed in the test after one day.

A: Little smudge on the white ground was observed in the test after 10 minutes and the test after one day.

B: Although unnoticeable smudges on the white ground were observed in the test after 10 minutes, little smudge on the white ground was observed in the test after one day.

C: Smudges on the white ground were observed in the test after 10 minutes and the test after one day.

D: Noticeable smudges on the white ground were observed in the test after 10 minutes and the test after one day.

Highlighter Resistance of Image 1

An ink cartridge filled with the ink prepared as described above was placed in the ink jet recording apparatus. A vertical rule having a width of 1/10 inches was recorded on a PPC sheet GF-500 (manufactured by CANON KABUSHIKI KAISHA). Five minutes and one day after the recording, the vertical rule was traced with a yellow highlighter OPTEX2 (manufactured by ZEBRA Co., Ltd.), and immediately after that a line was drawn with the yellow highlighter on a white ground of a recording medium to check for contamination of the pen nib and contamination of the line on the white ground. The following are evaluation criteria for the highlighter resistance of an image. Tables 5 and 6 show the results.

AAA: No contamination of the pen nib and no contamination of the line on the white ground were observed in the test after five minutes and the test after one day.

AA: In the test after five minutes, although coloring on the pen nib was observed, little contamination of the line on the white ground was observed. In the test after one day, there were no contamination of the pen nib and no contamination of the line on the white ground.

A: In the test after five minutes and the test after one day, although coloring on the pen nib was observed, little contamination of the line on the white ground was observed.

B: In the test after five minutes, although coloring on the pen nib was observed, the contamination of the line on the white ground was unnoticeable. In the test after one day, although coloring on the pen nib was observed, little contamination of the line on the white ground was observed.

C: In the test after five minutes and the test after one day, there were coloring of the pen nib and contamination of the line on the white ground.

D: In the test after five minutes and the test after one day, there were significant coloring of the pen nib and significant contamination of the line on the white ground.

Ink Ejection Stability

An ink cartridge filled with the ink prepared as described above was placed in the ink jet recording apparatus. A 19 cm*26 cm solid image (print duty 100%) was recorded on ten GF-500 PPC sheets (manufactured by CANON KABUSHIKI KAISHA). The solid image on the tenth sheet was visually inspected to evaluate ink ejection stability. The following are evaluation criteria for ink ejection stability. Tables 5 and 6 show the results.

A: Neither white streak nor faint streak was observed, and the solid image was properly recorded.

B: A few unnoticeable white streaks or faint streaks were observed.

C: Ink ejection was unstable, and white streaks or faint streaks were observed on the image.

Prevention of Image Deflection

An ink cartridge filled with the ink prepared as described above was placed in the ink jet recording apparatus. A 19 cm*26 cm solid image (print duty 100%) was recorded on two GF-500 PPC sheets (manufactured by CANON KABUSHIKI KAISHA). After the ink jet recording apparatus was left to stand for 30 minutes, recording the image on two GF-500 PPC sheets was performed ten times. A nozzle check pattern was then recorded with the ink jet recording apparatus (PIXUS iP3100). The nozzle check pattern was visually inspected for image deflection. After the removal of a recording head, the face of the recording head was observed with a microscope to check for face wetting. The following are evaluation criteria for image deflection and face wetting. Tables 5 and 6 show the results.

AA: No disorder in the nozzle check pattern was observed, indicating the prevention of image deflection. No face wetting was observed.

A: No disorder in the nozzle check pattern was observed, indicating the prevention of image deflection. Slight face wetting was observed.

B: An unnoticeable disorder in the nozzle check pattern was observed, indicating the prevention of image deflection. A little face wetting was observed.

C: A significant disorder in the nozzle check pattern was observed, and no satisfactory image was obtained, indicating the occurrence of image deflection. Face wetting was also observed.

TABLE 5

| | Evaluation results | | | | |
|---|---|---|---|---|---|
| | Evaluation of image | | | Evaluation of ink | |
| Example No. | Optical density | Scratch resistance | Highlighter resistance | Ejection stability | Prevention of image deflection |
| Example 1 | A | AAA | AAA | A | A |
| Example 2 | A | AAA | AAA | A | A |
| Example 3 | A | AAA | AAA | A | A |
| Example 4 | A | AAA | AAA | A | A |
| Example 5 | A | AAA | AAA | A | A |
| Example 6 | A | AAA | AAA | A | A |
| Example 7 | A | AAA | AAA | A | A |
| Example 8 | A | AAA | AAA | A | A |
| Example 9 | A | AAA | AAA | A | A |
| Example 10 | A | B | B | A | A |
| Example 11 | A | AAA | AAA | B | A |
| Example 12 | A | AAA | AAA | B | A |
| Example 13 | A | AAA | AAA | B | A |
| Example 14 | A | AAA | AAA | A | B |
| Example 15 | A | AAA | AAA | A | A |
| Example 16 | A | AAA | AAA | A | A |
| Example 17 | A | B | B | A | A |
| Example 18 | A | B | B | A | A |
| Example 19 | A | AAA | AAA | A | A |
| Example 20 | A | AAA | AAA | A | A |
| Example 21 | A | B | B | A | A |

TABLE 5-continued

| | Evaluation results | | | | |
|---|---|---|---|---|---|
| | Evaluation of image | | | Evaluation of ink | |
| Example No. | Optical density | Scratch resistance | Highlighter resistance | Ejection stability | Prevention of image deflection |
| Example 22 | A | AAA | AAA | A | A |
| Example 23 | A | AAA | AAA | A | A |
| Example 24 | A | B | B | A | A |
| Example 25 | A | B | B | A | A |
| Example 26 | A | B | B | A | A |
| Example 27 | A | AAA | AAA | B | A |
| Example 28 | A | AAA | AAA | A | A |
| Example 29 | A | AAA | AAA | A | A |
| Example 30 | A | B | B | A | A |
| Example 31 | A | AAA | AAA | A | A |
| Example 32 | A | AAA | AAA | A | A |
| Example 33 | AA | AAA | AAA | A | A |
| Example 34 | AA | AAA | AAA | A | A |
| Example 35 | AA | AAA | AAA | A | A |
| Example 36 | AA | AAA | AAA | A | A |
| Example 37 | A | AAA | AAA | A | A |
| Example 38 | A | AAA | AAA | A | A |
| Example 39 | A | B | B | A | A |
| Example 40 | A | AAA | AAA | B | A |
| Example 41 | A | AAA | AAA | A | A |

TABLE 6

| | Evaluation results | | | | |
|---|---|---|---|---|---|
| | Evaluation of image | | | Evaluation of ink | |
| Example No | Optical density | Scratch resistance | Highlighter resistance | Ejection stability | Prevention of image deflection |
| Comparative example 1 | A | AAA | AAA | A | C |
| Comparative example 2 | A | AAA | AAA | C | A |
| Comparative example 3 | A | C | C | A | A |
| Comparative example 4 | A | C | C | A | A |
| Comparative example 5 | A | C | C | A | A |
| Comparative example 6 | A | C | C | A | A |
| Comparative example 7 | A | C | C | C | A |
| Comparative example 8 | A | C | C | C | A |
| Comparative example 9 | A | C | C | C | A |
| Comparative example 10 | C | AAA | AAA | C | A |
| Comparative example 11 | C | B | C | C | A |
| Comparative example 12 | A | C | C | A | A |
| Comparative example 13 | AA | D | D | A | A |
| Comparative example 14 | C | D | D | B | B |
| Comparative example 15 | A | D | D | C | A |
| Comparative example 16 | A | C | C | C | A |
| Comparative example 17 | C | D | D | C | A |
| Comparative example 18 | B | C | C | C | C |
| Comparative example 19 | B | C | C | C | C |
| Comparative example 20 | A | C | C | C | A |
| Reference example 1 | C | AAA | AAA | A | A |
| Reference example 2 | C | A | A | A | AA |
| Reference example 3 | B | AAA | AAA | B | C |

Three minutes after the recording, the results of the evaluation Scratch Resistance of Image and Highlighter Resistance of Image for Example 41 were better than the results for Example 1.

Preparation of Ink 1 and 2

Ink 1

The pigment dispersion A and the polyurethane polymer dispersion PU-1 were mixed with other components as described below.

Pigment dispersion A (pigment content (solid content) was 10.0% by mass) 30.0% by mass
    Polyurethane polymer dispersion PU-1 (polymer content (solid content) was 20.0% by mass) 7.5% by mass
    Glycerin 9.0% by mass
    Diethylene glycol 5.0% by mass
    Triethylene glycol 5.0% by mass
    Acetylenol (trade name) E100 (surfactant, manufactured by Kawaken Fine Chemicals Co., Ltd.) 1.0% by mass
    Ion-exchanged water 42.5% by mass The mixture was well dispersed and was passed through a microfilter (manufactured by Fujifilm Corp.) having a pore size of 3.0 micrometers under pressure to prepare an ink 1.

Ink 2

The pigment dispersion B and the polyurethane polymer dispersion PU-1 were mixed with other components as described below.

Pigment dispersion B (pigment content (solid content) was 10.0% by mass) 30.0% by mass
Polyurethane polymer dispersion PU-1 (polymer content (solid content) was 20.0% by mass) 7.5% by mass
Glycerin 9.0% by mass
Diethylene glycol 5.0% by mass
Triethylene glycol 5.0% by mass
Acetylenol (trade name) E100 (surfactant, manufactured by Kawaken Fine Chemicals Co., Ltd.) 1.0% by mass
Ion-exchanged water 42.5% by mass The mixture was well dispersed and was passed through a microfilter (manufactured by Fujifilm Corp.) having a pore size of 3.0 micrometers under pressure to prepare an ink 2.

Preparation of Liquid Composition

Liquid Composition 1

The following components were mixed. The amount of ion-exchanged water (the remainder) was such that the total amount of the components of the ink was 100.0% by mass.

Reactant: calcium nitrate 5.0% by mass
Glycerin 5.0% by mass
1,5-pentanediol 5.0% by mass
Trimethylene glycol 7.0% by mass
Acetylenol (trade name) E100 (surfactant, manufactured by Kawaken Fine Chemicals Co., Ltd.) 0.1% by mass
Ion-exchanged water the remainder The mixture was well dispersed and was passed through a microfilter (manufactured by Fujifilm Corp.) having a pore size of 3.0 micrometers under pressure to prepare a liquid composition 1.

Liquid Composition 2

A liquid composition 2 was prepared in the same manner as in the liquid composition 1 except that the reactant calcium nitrate was replaced by aluminum nitrate.

Liquid Composition 3

A liquid composition 3 was prepared in the same manner as in the liquid composition 1 except that the reactant calcium nitrate was replaced by yttrium nitrate.

Liquid Composition 4

A liquid composition 4 was prepared in the same manner as in the liquid composition 1 except that the reactant calcium nitrate was replaced by magnesium nitrate.

Liquid Composition 5

The following components were mixed. The amount of ion-exchanged water (the remainder) was such that the total amount of the components of the ink was 100.0% by mass.

Reactant: sodium citrate 10.0% by mass
Glycerin 5.0% by mass
1,5-pentanediol 5.0% by mass
Trimethylolpropane 7.0% by mass
NIKKOL BC-20 (surfactant, manufactured by Nikko Chemicals Co., Ltd.) 1.0% by mass
Ion-exchanged water the remainder The mixture was well dispersed and was passed through a microfilter (manufactured by Fujifilm Corp.) having a pore size of 3.0 micrometers under pressure. The mixture was then treated with sulfuric acid to prepare a liquid composition 5 having a pH of 4.0.

Liquid Composition 6

A liquid composition 6 was prepared in the same manner as in the liquid composition 5 except that the pH was 3.0.

Liquid Composition 7

A liquid composition 7 was prepared in the same manner as in the liquid composition 5 except that the pH was 3.5.

Liquid Composition 8

A liquid composition 8 was prepared in the same manner as in the liquid composition 5 except that the pH was 5.5.

Liquid Composition 9

A liquid composition 9 was prepared in the same manner as in the liquid composition 5 except that the pH was 6.0.

The absorbances of the liquid compositions 1 to 9 without dilution were measured with a Hitachi double-beam spectrophotometer U-2900 (manufactured by Hitachi High-Technologies Corp.). Any of the liquid compositions had a ratio Amax/Amin of the maximum absorbance Amax to the minimum absorbance Amin of 1.0 or more and 2.0 or less at a wavelength in the range of 400 to 780 nm.

Evaluation 2

In the following evaluation, the criteria AAA to B refer to acceptable levels, and the criteria C and D refer to unacceptable levels. The Optical Density, Scratch Resistance of Image, and Highlighter Resistance of Image were evaluated with an ink jet recording apparatus PIXUS Pro9500 (manufactured by CANON KABUSHIKI KAISHA). The recording conditions included a temperature of 23 degrees Celsius and a relative humidity of 55%. An ink cartridge separately filled with the ink and the liquid composition listed in Table 7 was placed in the ink jet recording apparatus PIXUS Pro9500. The ink was contained in a chamber for yellow, and the liquid composition was contained in a chamber for gray. Recording was performed unidirectionally from the home position to the opposite position. The width of the recording corresponded to the nozzle width of the head. After the liquid composition was applied, the ink was applied on the liquid composition in the same pass to form an image. With the ink jet recording apparatus, an image recorded under the conditions under which approximately 16 ng of one ink droplet was applied to a unit area (one pixel) of 1/600 inches*1/600 inches at a resolution of 600 dpi*600 dpi was assumed to have an ink print duty of 100%. An image recorded under the conditions under which approximately 7 ng of one droplet of the liquid composition was applied to one pixel was assumed to have a liquid composition print duty of 100%.

Optical Density 2

An ink cartridge filled with the ink and the liquid composition prepared as described above was placed in the ink jet recording apparatus. A 2 cm*2 cm solid image (ink and liquid composition print duties 100%) was printed on four types of recording media: a PPC sheet GF-500 (manufactured by CANON KABUSHIKI KAISHA), a PPC sheet 4024 (manufactured by Xerox Corp.), a PPC sheet Bright White (manufactured by Hewlett-Packard Co.), and a PPC sheet Hammermill Jet Print (manufactured by International Paper). After the solid image was left to stand for one day, the optical density was measured with a reflection densitometer Macbeth RD-918 (manufactured by Macbeth). The following are evaluation criteria for optical density. Table 7 shows the results.

AA: The average optical density of the four recording media was 1.40 or more, and the highest optical density was 1.60 or more.

A: The average optical density of the four recording media was 1.40 or more, but the highest optical density was 1.55 or more and less than 1.60.

B: The average optical density of the four recording media was 1.40 or more, but the highest optical density was less than 1.55.

C: The average optical density of the four recording media was less than 1.40.

Scratch Resistance of Image 2

An ink cartridge filled with the ink and the liquid composition prepared as described above was placed in the ink jet recording apparatus. A 1.0 inch*0.5 inches solid image (ink and liquid composition print duties 100%) was recorded on a PPC sheet GF-500 (manufactured by CANON KABUSHIKI KAISHA).

(1) Evaluation of Scratch Resistance of Image Three Minutes After Recording

Three minutes after the recording, a Silbon paper and a weight having a contact pressure of 40 g/cm$^2$ were placed on the solid image, and the solid image and the Silbon paper were rubbed together. After the Silbon paper and the weight were removed, smudges on the solid image and a transfer to the white ground of the Silbon paper were visually inspected. The following are evaluation criteria for the scratch resistance of an image. Table 7 shows the results.

AA: No smudge on the white ground was observed in the test after three minutes.

A: Little smudge on the white ground was observed in the test after three minutes.

B: Unnoticeable smudges on the white ground were observed in the test after three minutes.

C: Smudges on the white ground were observed in the test after three minutes.

D: Noticeable smudges on the white ground were observed in the test after three minutes.

(2) Evaluation of Scratch Resistance of Image 10 Minutes and One Day After Recording Ten minutes and one day after the recording, a Silbon paper and a weight having a contact pressure of 40 g/cm$^2$ were placed on the solid image, and the solid image and the Silbon paper were rubbed together. After the Silbon paper and the weight were removed, smudges on the solid image and a transfer to the white ground of the Silbon paper were visually inspected. The following are evaluation criteria for the scratch resistance of an image. Table 7 shows the results.

AAA: No smudge on the white ground was observed in the test after 10 minutes and the test after one day.

AA: Little smudge on the white ground was observed in the test after 10 minutes, and no smudge on the white ground was observed in the test after one day.

A: Little smudge on the white ground was observed in the test after 10 minutes and the test after one day.

B: Although unnoticeable smudges on the white ground were observed in the test after 10 minutes, little smudge on the white ground was observed in the test after one day.

C: Smudges on the white ground were observed in the test after 10 minutes and the test after one day.

D: Noticeable smudges on the white ground were observed in the test after 10 minutes and the test after one day.

Highlighter Resistance of Image 2

An ink cartridge filled with the ink and the liquid composition prepared as described above was placed in the ink jet recording apparatus. A vertical rule having a width of 1/10 inches was recorded on a PPC sheet GF-500 (manufactured by CANON KABUSHIKI KAISHA).

(1) Evaluation of Highlighter Resistance of Image Three Minutes After Recording

Three minutes after the recording, the vertical rule was traced with a yellow highlighter OPTEX2 (manufactured by ZEBRA Co., Ltd.), and immediately after that a line was drawn with the yellow highlighter on a white ground of a recording medium to check for contamination of the pen nib and contamination of the line on the white ground. The following are evaluation criteria for the highlighter resistance of an image. Table 7 shows the results.

AA: No contamination of the pen nib and no contamination of the line on the white ground were observed in the test after three minutes.

A: In the test after three minutes, although coloring on the pen nib was observed, little contamination of the line on the white ground was observed.

B: In the test after three minutes, although coloring on the pen nib was observed, the contamination of the line on the white ground was unnoticeable.

C: In the test after three minutes, there were coloring of the pen nib and contamination of the line on the white ground.

D: In the test after three minutes, there were significant coloring of the pen nib and significant contamination of the line on the white ground.

(2) Evaluation of Highlighter Resistance of Image Five Minutes and One Day After Recording Five minutes and one day after the recording, the vertical rule was traced with a yellow highlighter OPTEX2 (manufactured by ZEBRA Co., Ltd.), and immediately after that a line was drawn with the yellow highlighter on a white ground of a recording medium to check for contamination of the pen nib and contamination of the line on the white ground. The following are evaluation criteria for the highlighter resistance of an image. Table 7 shows the results.

AAA: No contamination of the pen nib and no contamination of the line on the white ground were observed in the test after five minutes and the test after one day.

AA: In the test after five minutes, although coloring on the pen nib was observed, little contamination of the line on the white ground was observed. In the test after one day, there were no contamination of the pen nib and no contamination of the line on the white ground.

A: In the test after five minutes and the test after one day, although coloring on the pen nib was observed, little contamination of the line on the white ground was observed.

B: In the test after five minutes, although coloring on the pen nib was observed, the contamination of the line on the white ground was unnoticeable. In the test after one day, although coloring on the pen nib was observed, little contamination of the line on the white ground was observed.

C: In the test after five minutes and the test after one day, there were coloring of the pen nib and contamination of the line on the white ground.

D: In the test after five minutes and the test after one day, there were significant coloring of the pen nib and significant contamination of the line on the white ground.

TABLE 7

Combination of liquid composition and ink and evaluation results

| | | | | Evaluation of image | | | |
| --- | --- | --- | --- | --- | --- | --- | --- |
| | | | | Scratch resistance | | Highlighter resistance | |
| Example | Liquid composition No. | Ink No. | Optical density | (1) 3 min after recording | (2) 10 min and 1 day after recording | (1) 3 min after recording | (2) 5 min and 1 day after recording |
| Example 42 | Liquid composition 1 | Ink 1 | AA | AAA | AA | AAA | AA |
| Example 43 | Liquid composition 1 | Ink 2 | AA | AAA | AA | AAA | AA |
| Example 44 | Liquid composition 2 | Ink 1 | AA | AAA | AA | AAA | AA |
| Example 45 | Liquid composition 3 | Ink 1 | AA | AAA | AA | AAA | AA |
| Example 46 | Liquid composition 4 | Ink 1 | AA | AAA | A | AAA | A |
| Example 47 | Liquid composition 5 | Ink 1 | AA | AAA | AA | AAA | AA |
| Example 48 | Liquid composition 6 | Ink 1 | AA | AAA | AA | AAA | AA |
| Example 49 | Liquid composition 7 | Ink 1 | AA | AAA | AA | AAA | AA |
| Example 50 | Liquid composition 8 | Ink 1 | AA | AAA | AA | AAA | AA |
| Example 51 | Liquid composition 9 | Ink 1 | AA | AAA | B | AAA | B |

When the liquid composition had a pH of less than 3.5, as in Example 48, the wettability of a member in contact with the liquid composition was inferior to the liquid composition having a pH of 3.5 or more (for example, Example 49).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-075884, filed Mar. 30, 2011, and Japanese Patent Application No. 2011-075885, filed Mar. 30, 2011, which are hereby incorporated by reference herein in their entirety.

The invention claimed is:

1. An ink jet ink, comprising: a polyurethane polymer and a self-dispersing pigment, the polyurethane polymer having units derived from a polyisocyanate, a polyol having no acid group, and a diol having an acid group,
   wherein the polyol having no acid group contains a polyether polyol having no acid group, and the percentage (% by mole) constituted by a unit derived from the polyether polyol having no acid group with respect to all the units derived from the polyol having no acid group is 80% by mole or more,
   the polyether polyol has a number-average molecular weight of 450 or more to 4,000 or less,
   the ratio of the percentage (% by mole) of urethane bonds in the polyurethane polymer to the percentage (% by mole) of urea bonds in the polyurethane polymer is 85.0/15.0 or more to 100.0/0 or less, and
   the diol having an acid group is at least one selected from dimethylolpropionic acid and dimethylolbutanoic acid, and the acid value of the polyurethane polymer resulting from the unit(s) derived from the diol having an acid group is 40 mgKOH/g or more to 140 mgKOH/g or less.

2. The ink jet ink according to claim 1, wherein the polyisocyanate contains a hexamethylene diisocyanate, and the percentage (% by mole) constituted by the unit(s) derived from the hexamethylene diisocyanate with respect to all the units derived from the polyisocyanate in the polyurethane polymer is 10% by mole or more to 90% by mole or less.

3. The ink jet ink according to claim 1, wherein the polyurethane polymer is a cross-linked polyurethane polymer.

4. The ink jet ink according to claim 1, wherein the ratio of the percentage (% by mole) of urethane bonds in the polyurethane polymer to the percentage (% by mole) of urea bonds in the polyurethane polymer is 85.0/15.0 or more to 98.5/1.5 or less.

5. The ink jet ink according to claim 1, wherein the polyether polyol having no acid group contains at least one selected from poly(ethylene glycol), poly(propylene glycol), poly(1,2-butylene glycol), and poly(1,3-butylene glycol).

6. The ink jet ink according to claim 1, wherein the polyether polyol having no acid group contains poly(propylene glycol).

7. The ink jet ink according to claim 1, wherein the ratio of the polyurethane polymer content (% by mass) of the ink to the self-dispersing pigment content (% by mass) based on the total mass of the ink is 0.05 or more to 2.00 or less.

8. The ink jet ink according to claim 1, further comprising a salt.

9. The ink jet ink according to claim 8, wherein the salt contains at least one anion selected from $Cl^-$, $Br^-$, $I^-$, $ClO^-$, $ClO^{2-}$, $ClO^{3-}$, $ClO^{4-}$, $NO^{2-}$, $NO^{3-}$, $SO_4^{2-}$, $CO_3^{2-}$, $HCOO^-$, $CH_3COO^-$, $C_2H_4(COO^-)_2$, $C_6H_5COO^-$, and $C_6H_4(COO^-)_2$.

10. An ink cartridge, comprising an ink storage portion configured to store an ink, wherein the ink is an ink jet ink according to claim 1.

11. An ink jet recording method, comprising ejecting an ink by an ink jet method, wherein the ink is an ink jet ink according to claim 1.

12. An ink jet recording method, comprising: ejecting an ink containing a pigment and a polyurethane polymer through an ink jet recording head onto a recording medium; and applying a liquid composition to the recording medium such that the liquid composition at least partly overlaps the ink, the liquid composition destabilizing the dispersion of the pigment in the ink and decreasing the solubility of the polyurethane polymer, wherein the ink is an ink jet ink according to claim 1.

* * * * *